(12) United States Patent
Krunz et al.

(10) Patent No.: US 10,439,755 B1
(45) Date of Patent: Oct. 8, 2019

(54) SYSTEMS AND METHODS FOR SECURING WIRELESS COMMUNICATIONS

(71) Applicant: ARIZONA BOARD OF REGENTS ON BEHALF OF THE UNIVERSITY OF ARIZONA, Tucson, AZ (US)

(72) Inventors: Marwan M. Krunz, Tucson, AZ (US); Berk Akgun, Tucson, AZ (US); Peyman Siyari, Tucson, AZ (US); Hanif Rahbari, Tucson, AZ (US); Rashad Mohamed Eletreby, Tucson, AZ (US); Onur Ozan Koyluoglu, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/012,620

(22) Filed: Jun. 19, 2018

Related U.S. Application Data

(62) Division of application No. 15/336,070, filed on Oct. 27, 2016.
(60) Provisional application No. 62/246,862, filed on Oct. 27, 2015.

(51) Int. Cl.
    *H04K 3/00*         (2006.01)
    *H04B 1/12*         (2006.01)
(52) U.S. Cl.
    CPC ............... *H04K 3/60* (2013.01); *H04B 1/12* (2013.01)
(58) Field of Classification Search
    CPC ............ H04K 1/00–2203/36; H04B 1/12
    See application file for complete search history.

(56) References Cited

U.S. PATENT DOCUMENTS 9,672,394 B2     6/2017    Han et al.

OTHER PUBLICATIONS

"An Approach to Secure Wireless Communications Using Randomized Eigenvector-Based Jamming Signals", Ma et al., IWCMC, Jun. 28-Jul. 2, 2010.*
"Improving Physical Layer Secrecy Using Full-Duplex Jamming Receivers", Zheng et al., IEEE Transactions on Signal Processing, Oct. 15, 2013.*

(Continued)

*Primary Examiner* — Raymond S Dean
(74) *Attorney, Agent, or Firm* — Nguyen Tarbet

(57) ABSTRACT

Systems and methods of friendly jamming for securing wireless communications at the physical layer are presented. Under the assumption of exact knowledge of the eavesdropping channel, a resource-efficient distributed approach is used to improve the secrecy sum-rate of a multi-link network with one or more eavesdroppers while satisfying an information-rate constraint for all links. A method based on mixed strategic games can offer robust solutions to the distributed secrecy sum-rate maximization. In addition, a block fading broadcast channel with a multi-antenna transmitter, sending two or more independent confidential data streams to two or more respective users in the presence of a passive eavesdropper is considered. Lastly, a per-link strategy is considered and an optimization problem is formulated, which aims at jointly optimizing the power allocation and placement of the friendly jamming devices for a given link under secrecy constraints.

2 Claims, 14 Drawing Sheets

(56) References Cited

OTHER PUBLICATIONS

"Confidential Broadcasting via Linear Precoding in Non-Homogeneous MIMO Multiuser Networks", Yang et al., IEEE Transactions on Signal Processing, Jul. 2014.*

"Linear Precoding of Data and Artificial Noise in Secure Massive MIMO Systems", Zhu et al., IEEE, Sep. 2, 2015.*

A. Mukherjee, S. Fakoorian, J. Huang, and A. Swindlehurst, "Principles of physical layer security in multiuser wireless networks: A survey," IEEE Commun. Surv. Tut., vol. 16, No. 3, pp. 1550-1573, Feb. 2014.

S. Vasudevan, D. Goeckel, and D. F. Towsley, "Security-capacity tradeoff in large wireless networks using keyless secrecy," in Proc. ACM Int. Symp. Mobile Ad Hoc Networking and Computing, 2010, pp. 21-30.

Y.-S. Shiu, S. Y. Chang, H.-C. Wu, S.-H. Huang, and H.-H. Chen, "Physical layer security in wireless networks: a tutorial," IEEE Commun. Mag., vol. 18, No. 2, pp. 66-74, Apr. 2011.

S. Goel and R. Negi, "Guaranteeing secrecy using artificial noise," IEEE Trans. Wireless Commun., vol. 7, No. 6, pp. 2180-2189, Jun. 2008.

G. Foschini and Z. Miljanic, "A simple distributed autonomous power control algorithm and its convergence," IEEE Trans. Veh. Technol., vol. 42, No. 4, pp. 641-646, Nov. 1993.

G. Scutari, F. Facchinei, J.-S. Pang, and D. Palomar, "Real and complex monotone communication games," IEEE Trans. Inf. Theory, vol. 60, No. 7, pp. 4197-4231, Jul. 2014.

X. Tang, R. Liu, P. Spasojevic, and H. Poor, "Interference-assisted secret communication," in Proc. IEEE Inf. Theory Workshop, May 2008, pp. 164-168.

A. Rabbachin, A. Conti, and M. Win, "The role of aggregate interference on intrinsic network secrecy," in Proc. IEEE Int. Conf. Commun., Jun. 2012, pp. 3548-3553.

O. Koyluoglu, H. El Gamal, L. Lai, and H. Poor, "On the secure degrees of freedom in the k-user gaussian interference channel," in IEEE Int. Symp. Inf. Theory, Jul. 2008, pp. 384-388.

X. He and A. Yener, "The interference wiretap channel with an arbitrarily varying eavesdropper Aligning interference with artificial noise," in Proc. 50th Annu. Allerton Conf. Commun., Contr., and Comput., Oct. 2012, pp. 204-211.

S. Agrawal and S. Vishwanath, "On the secrecy rate of interference networks using structured codes," in IEEE Int. Symp. Inf. Theory, Jun. 2009, pp. 2091-2095.

A. Kalantari, S. Maleki, G. Zheng, S. Chatzinotas, and B. Ottersten, "Joint power control in wiretap interference channels," IEEE Trans. Wireless Commun., vol. 14, No. 7, pp. 3810-3823, Jul. 2015.

T. Lv, H. Gao, and S. Yang, "Secrecy transmit beamforming for heterogeneous networks," IEEE J. Sel. Areas Commun., vol. 33, No. 6, pp. 1154-1170, Jun. 2015.

S. Fakoorian and A. Swindlehurst, "MIMO interference channel with confidential messages: Game theoretic beamforming designs," in Proc. Asilomar Conf. on Signals, Syst., and Comput., Nov. 2010, pp. 2099-2103.

J. Zhu, J. Mo, and M. Tao, "Cooperative secret communication with artificial noise in symmetric interference channel," IEEE Commun. Lett., vol. 14, No. 10, pp. 885-887, Oct. 2010.

A. Goldsmith and S.-G. Chua, "Variable-rate variable-power MQAM for fading channels," IEEE Trans. Commun., vol. 45, No. 10, pp. 1218-1230, Oct. 1997.

Y. Zhou, Z. Z. Xiang, Y. Zhu, and Z. Xue, "Application of full-duplex wireless technique into secure MIMO communication: Achievable secrecy rate based optimization," IEEE Signal Process. Lett., vol. 21, No. 7, pp. 804-808, Jul. 2014.

G. Scutari, D. Palomar, and S. Barbarossa, "Optimal linear precoding strategies for wideband noncooperative systems based on game theory, part I: Nash equilibria," IEEE Trans. Signal Process., vol. 56, No. 3, pp. 1230-1249, Mar. 2008.

D. Schmidt, C. Shi, R. Berry, M. Honig, and W. Utschick, "Distributed resource allocation schemes," IEEE Signal Processing Mag., vol. 26, No. 5, pp. 53-63, Sep. 2009.

D. Nguyen and M. Krunz, "Price-based joint beamforming and spectrum management in multi-antenna cognitive radio networks," IEEE J. Sel. Areas Commun., vol. 30, No. 11, pp. 2295-2305, Dec. 2012.

A. Lozano, A. Tulino, and S. Verdu, "High-snr power offset in multiantenna communication," IEEE Trans. Inf. Theory, vol. 51, No. 12, pp. 4134-4151, Dec. 2005.

M. Ghogho and A. Swami, "Physical-layer secrecy of MIMO communications in the presence of a poisson random field of eavesdroppers," in Proc. IEEE Int. Conf. Commun., Jun. 2011, pp. 1-5.

G. Pederzoli, "On the ratio of generalized variances," Commun. in Stat.—Theory and Methods, vol. 12, No. 24, pp. 2903-2909, Jan. 1983.

M. Boon, Generating random variables. [Online]. Available: http://www.win.tue.nl/ marko/2WB05/lecture8.pdf.

W. Yu, G. Ginis, and J. Cioffi, "Distributed multiuser power control for digital subscriber lines," IEEE J. Sel. Areas Commun., vol. 20, No. 5, pp. 1105-1115, Jun. 2002.

A. D. Wyner, "The wire-tap channel," Bell System Technical Journal, vol. 54, No. 8, pp. 1355-1387, 1975.

I. Csisz'ar and J. Korner, "Broadcast channels with confidential messages," IEEE Transactions on Information Theory, vol. 24, No. 3, pp. 339-348, 1978.

F. Oggier and B. Hassibi, "The secrecy capacity of the MIMO wiretap channel," IEEE Transactions on Information Theory, vol. 57, No. 8, pp. 4961-4972, 2011.

G. Bagherikaram, A. S. Motahari, and A. K. Khandani, "The secrecy capacity region of the Gaussian MIMO broadcast channel," IEEE Transactions on Information Theory, vol. 59, No. 5, pp. 2673-2682, 2013.

A. Mukherjee and A. L. Swindlehurst, "Robust beamforming for security in MIMO wiretap channels with imperfect CSI," IEEE Transactions on Signal Processing, vol. 59, No. 1, pp. 351-361, 2011.

J. Huang and A. L. Swindlehurst, "Cooperative jamming for secure communications in MIMO relay networks," IEEE Transactions on Signal Processing, vol. 59, No. 10, pp. 4871-4884, 2011.

J. Yang, I.-M. Kim, and D. I. Kim, "Joint design of optimal cooperative jamming and power allocation for linear precoding", IEEE Transactions on Communications, vol. 62, No. 9, pp. 3285-3298, 2014.

W. Li, M. Ghogho, B. Chen, and C. Xiong, "Secure communication via sending artificial noise by the receiver: outage secrecy capacity/region analysis," IEEE Communications Letters, vol. 16, No. 10, pp. 1628-1631, 2012.

G. Zheng, I. Krikidis, J. Li, A. P. Petropulu, and B. Ottersten, "Improving physical layer secrecy using full-duplex jamming receivers," IEEE Transactions on Signal Processing, vol. 61, No. 20, pp. 4962-4974, 2013.

F. Zhu, F. Gao, M. Yao, and J. Li, "Joint information-and jamming beamforming for full duplex secure communication," in Proc. of the IEEE Global Communications Conference (GLOBECOM'14), 2014, pp. 1614-1618.

X. He, H. Dai, Y. Huang, D. Wang, W. Shen, and P. Ning, "The security of link signature: A view from channel models," in Proc. of the IEEE Conference on Communications and Network Security (CNS'14), pp. 103-108.

X. He, H. Dai, W. Shen, and P. Ning, "Is link signature dependable for wireless security," in Proc. of IEEE INFOCOM'13 Conf., pp. 200-204.

O. O. Koyluoglu and H. El Gamal, "Cooperative encoding for secrecy in interference channels," IEEE Transactions on Information Theory, vol. 57, No. 9, pp. 5682-5694, 2011.

P. K. Gopala, L. Lai, and H. El Gamal, "On the secrecy capacity of fading channels," IEEE Transactions on Information Theory, vol. 54, No. 10, pp. 4687-4698, 2008.

D. Bharadia, E. Mcmilin, and S. Katti, "Full duplex radios," in Proc. of the ACM SIGCOMM'13 Conf., Hong Kong, China, Aug. 2013, pp. 375-386.

X. He, H. Dai, W. Shen, and P. Ning, "Channel correlation modeling for link signature security assessment," in Proc. of the ACM HotSoS'14 Conf.

(56) References Cited

OTHER PUBLICATIONS

J. Zhang, L. Fu, and X. Wang, "Asymptotic analysis on secrecy capacity in large-scale wireless networks," IEEE/ACM Trans. Networking, vol. 22, No. 1, pp. 66-79, Feb. 2014.

A Sheikholeslami, D. Goeckel, H. Pishro-Nik, and D. Towsley, "Physical layer security from inter-session interference in large wireless networks," in Pro. IEEE INFOCOM'12, Mar. 2012, pp. 1179-1187.

M. Ghaderi, D. Goeckel, A. Orda, and M. Dehghan, "Efficient wireless security through jamming, coding and routing," in 10th Ann. IEEE Commun. Society Conf. Sensor, Mesh and Ad Hoc Communications and Networks SECON'13, Jun. 2013, pp. 505-513.

M. Ghaderi, D. Goeckel, A. Orda, and M. Dehghan, "Minimum energy routing and jamming to thwart wireless network eavesdroppers," IEEE Trans. Mobile Computing, 2014.

D. Goeckel, S. Vasudevan, D. Towsley, S. Adams, Z. Ding, and K. Leung, "Artificial noise generation from cooperative relays for everlasting secrecy in two-hop wireless networks," IEEE Journal on Selected Areas in Communications, vol. 29, No. 10, pp. 2067-2076, Dec. 2011.

H. Rahul, H. Hassanieh, and D. Katabi, "SourceSync: a distributed wireless architecture for exploiting sender diversity," in Proc. ACM SIGCOMM'10 conf., 2011, pp. 171-182.

T. Shu and M. Krunz, "Coverage-time optimization for clustered wireless sensor networks: A power-balancing approach," IEEE/ACM Trans. on Networking, vol. 18, No. 1, pp. 202-215, Feb. 2010.

M. Chiang, C. W. Tan, D. Palomar, D. O'Neill, and D. Julian, "Power control by geometric programming," IEEE Trans. Wireless Communications, vol. 6, No. 7, pp. 2640-2651, Jul. 2007.

O. Koyluoglu, C. Koksal, and H. Gamal, "On secrecy capacity scaling in wireless networks," IEEE Trans. Information Theory, vol. 58, No. 5, pp. 3000-3015, May 2012.

\* cited by examiner

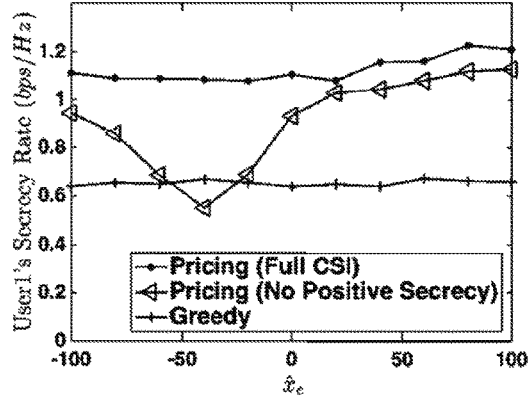 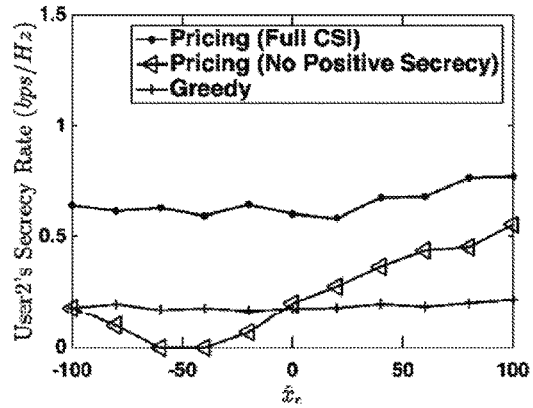
FIG. 5A  FIG. 5B
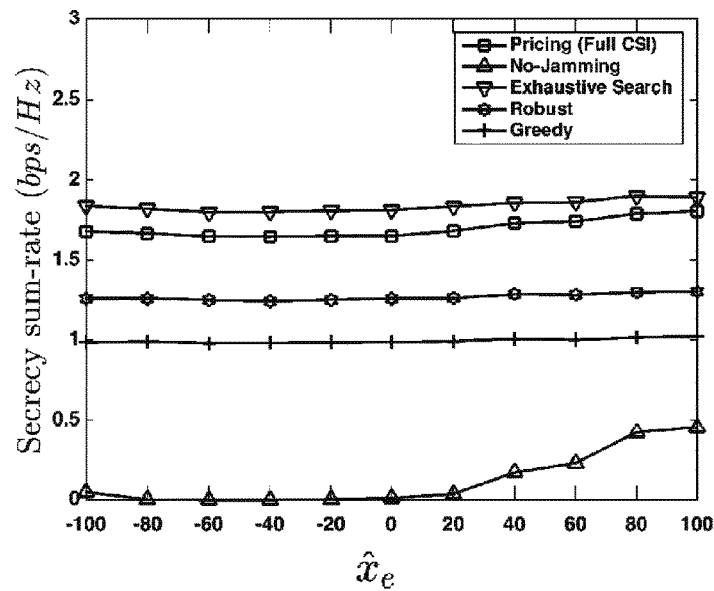
FIG. 6

SYSTEMS AND METHODS FOR SECURING WIRELESS COMMUNICATIONS

CROSS REFERENCE

This application claims priority and is a divisional of U.S. Non-Provisional patent application Ser. No. 15/336,070 filed Oct. 27, 2016, and claims priority to U.S. Provisional Patent Application No. 62/246,862 filed Oct. 27, 2015, the specification(s) of which is/are incorporated herein in their entirety by reference.

GOVERNMENT SUPPORT

This invention was made with government support under Grant No. 1016943 awarded by NSF and Grant No. W911NF-13-1-0302, awarded by ARMY/ARO. The government has certain rights in the invention.

FIELD OF THE INVENTION

The present invention relates to friendly jamming systems and methods for securing wireless communication at the physical layer.

BACKGROUND OF THE INVENTION

The broadcast nature of wireless communication systems makes them vulnerable to wiretapping by a malicious eavesdropper. Physical-layer security (PHY-layer security) provides a cost-effective solution to this problem through secret communications that do not require a hand-shaking mechanism between the communicating parties [1a], [2a]. Several approaches in the area of PHY-layer security have been proposed in the last decade (see [3a] and reference therein). Among the most promising is the method of artificial noise (AN), also known as friendly jamming (FJ), which guarantees a nonzero secrecy rate for a user without knowing the eavesdropper's location [4a]. Secrecy rate (capacity) is defined as the maximum rate at which a transmitter (Alice) can securely transmit information to its legitimate receiver (Bob). This rate is the difference between the mutual information between Alice and Bob, to that between Alice and an eavesdropper (Eve). Basically, in the AN method, Alice uses multiple antennas to generate AN, increasing the interference at Eve but not interfering with Bob.

The increasing demands for wireless services together with the scarcity of wireless spectrum forces users to share the same band. Sharing the spectrum leads to interference among users. To accommodate simultaneous transmission of several information signals in a network, the friendly jamming signal of each transmitter must be designed to not interfere with other legitimate receivers in the network. To avoid such interference and yet prevent the leakage of the transmission signature, one solution is to exploit multiple input, multiple output (MIMO) precoding to ensure that the null space of any friendly jamming signal includes the locations of all legitimate receivers but excludes potential eavesdropping locations. This solution, however, is not practical in situations where coordination between legitimate transmitters is challenging (e.g., mobile ad-hoc networks). Therefore, the need for interference management is crucial to guarantee secure yet non-interfering communications. Interference management roots back to the power control problem in traditional interference channel networks, which has been extensively investigated ([5a], [6a]). The main challenge there is to manage the interference at all of the receivers so as to maximize the sum of individual rates.

In a similar way, in the interference wiretap channel, the unwanted interference from one transmitter degrades the received signal power at other receivers, reducing the efficiency of the network in terms of secrecy rate. However, the possibility of increasing interference at Eve makes the unwanted interference potentially useful in assisting a more secure communication. This idea was investigated in [7a], [8a]. The effect of interference alignment in providing secure transmissions was investigated in [9a] and [10a]. Other approaches employ special codebooks for the transmitters to improve the secrecy in the network [11a]. In some studies, a particular user is assumed to be eavesdropped on, and the objective is to maximize the secrecy rate of that user while satisfying a rate constraint for other users in the network. In other words, users coordinate with each other to increase interference at the eavesdropper while maintaining their own rate requirements. As an example, in [12a] the authors considered a two-user single input, single output (SISO) interference channel with an eavesdropper. By jointly optimizing the transmission powers of the two users (without AN), the authors tried to maximize the secrecy rate for one user while maintaining a given quality of service (QoS) for the other user. Another example is [13a], where the authors study this problem in a two-tier heterogeneous downlink comprised of one macrocell and several femtocells. In particular, the authors propose a transmit beamforming method for the signals intended to both macrocell users and femtocell users so as to maximize the secrecy rate of one eavesdropped macrocell user. This maximization is subject to satisfying the rate requirements of all other macrocell users.

In other works, PHY-layer security was studied when users have confidential messages and there is no eavesdropper in the network. In other words, the transmission of one user is not to be captured by unintended receivers. In [14a] a MIMO interference channel with confidential messages was studied using game theory to find an operating point that balances the network performance and fairness. The work in [15a] considered the secrecy rate region of the interference channel when users transmit AN along with their data. They showed that by using AN, the secrecy rate region will be larger than when AN is not employed.

As wireless mobile systems continue to be widely adopted, confidentiality of their communication becomes one of the main concerns due to the broadcast nature of the wireless medium. Cryptographic techniques can be utilized to address these concerns, but such techniques often rely on computational limitations at the adversaries (an assumption that may not hold with advances in computing power) and are mostly based on unproven conjectures (e.g., hardness of some computing problems). Physical (PHY) layer security, on the other hand, can be implemented regardless of the adversary's computational power. It also takes advantage of the characteristics of the wireless medium.

Wyner [1b] initiated the concept of secrecy capacity by defining the degraded wiretap channel. The authors in [2b] extended Wyner's work to non-degraded discrete memoryless broadcast channels. Later on, the secrecy capacity of MIMO wiretap channel was determined [3b]. In [4b], the authors obtained the secrecy region of the Gaussian MIMO broadcast channel. To guarantee secrecy, Goel and Negi [5b] introduced the concept of artificial noise, a.k.a. friendly jamming. The idea is to artificially generate noise over the channel in order to degrade eavesdropping. The authors in

[6b] used a similar approach for security in MIMO wiretap channels under imperfect channel state information (CSI). Cooperative jamming strategies for two-hop MIMO relay networks in the presence of an eavesdropper that can wiretap both channels were proposed in [7b]. The authors in [8b] studied a multiuser broadcast channel where a sender transmits K independent streams to K receivers. They jointly designed linear precoding of the transmitted signals and cooperative jamming so as to enhance PHY security. A full-duplex (FD) receiver that sends artificial noise for secure communication was proposed in [9b]. At least two antennas are needed at the receiver, one for sending the jamming signal and the other to receive the information message. A similar system model was used in [10b]. However, the authors in [10b] did not assume complete self-interference suppression (SIS) as in [9b].

Another system model with one full-duplex base station (BS), one transmitter, one receiver, and one eavesdropper was considered in [11b]. In this model, the BS receives a message from the transmitter while sending an information message to the receiver together with a friendly jamming (FJ) signal. The authors assumed that the transmitter's signal does not interfere at the receiver, and they solved the problem of maximizing the secret transmit rate. Remarkably, none of above works includes receivers with "full-duplex antennas", as multi-antenna FD receivers considered therein refer to having some antennas exclusively used for receiving data and others to send FJ signals. Moreover, none of these studies consider a multiuser scenario where receivers send friendly jamming signals. In contrast, the present invention considers a K-user scenario (where K is greater than or equal to two) with single-antenna full-duplex receivers that also generate their own friendly jamming signals. Receivers are not allowed to decode any transmitted information signal not intended for them (confidential communications), and the information leakage to eavesdroppers for each information message is vanishing. In addition, the present invention also addresses scenarios where eavesdropping channels are correlated with those of legitimate receivers.

The broadcast nature of the wireless medium exposes communications to eavesdropping and privacy attacks. Although cryptography can be used to protect the information secrecy of a data frame's payload, it is not sufficient to prevent the leakage of side-channel information from unencrypted headers. Moreover, in many wireless standards, such as 802.11, management and control frames are often sent in the clear. Various operations of a wireless protocol, such as establishing session keys, rely on the exchange of these frames. Information theoretic secrecy [1c], [2c] at the physical (PHY) layer is a lightweight approach that aims at preventing an eavesdropper (Eve) from decoding a plaintext frame. A transmitter (Alice) and its legitimate receiver (Bob) are guaranteed secret communications if the Alice-Bob channel is better than Alice-Eve channel. In [1c], the notion of secrecy capacity was introduced as the maximum rate at which Alice can securely transmit information to Bob. This rate is the difference between the mutual information between Alice and Bob, to that between Alice and Eve.

Non-zero secrecy capacity is not always possible. For example, if Eve is closer to Alice than Bob, then the Alice-Eve channel may be better than the Alice-Bob channel, resulting in zero secrecy capacity [1c]. Friendly jamming (FJ), proposed in the pioneering work of Goel and Negi [5b], can be used to degrade the Alice-Eve channel without harming Bob's reception. Essentially, a FJ signal is a randomly generated artificial noise. To nullify the FJ signal at Bob, the authors in [5b] considered the case when Alice has multiple antennas. Alternatively, a bank of relay nodes can be utilized to transmit the artificial noise in the null space of the Alice-Bob channel.

Although FJ-based PHY-layer security has been extensively considered for single-link scenarios, only a few papers studied the problem in multi-link scenarios. Research efforts on secret communications in a multi-link network can be classified into two broad categories: Large-scale [4c], [5c], and [13c] and small-scale wireless networks [6c], [7c]. Considering a large-scale wireless network consisting of n nodes, the authors in [4c] derived the per-node asymptotic secrecy capacity. They also proposed to use "Rx-based FJ", whereby legitimate full-duplex receivers are able to cancel the self-interference resulting from their generation of FJ signals. For the case of independent eavesdroppers, it was shown that a per-node secrecy capacity of $\theta(1/\sqrt{n})$ is achievable, which is the same per-node capacity without secrecy considerations. These results imply that the per-node secrecy capacity is not affected by the presence of eavesdroppers. However, placing the FJ devices at the same locations of the communicating nodes may not be optimal from an energy consumption perspective. The interference of Rx-based FJ on other receivers was also not considered in [4c]. The authors in [5c] explored allowing a fraction of transmitters to cooperatively send their signals to their receivers through relay nodes, i.e., two-hop communications. The idea is based on the work in [8c]; wherein, for each Alice-Bob pair, a relay node with "good" channels to Alice and Bob is selected. Relay nodes with "bad" channels to the selected relay or to Bob are used to produce FJ signals to confuse passive eavesdroppers. Instead of generating FJ signals, simultaneous transmissions are exploited in [5c] to create high interference at the eavesdroppers. In this sense, the messages of other Alice-Bob pairs are utilized as FJ signals. Secrecy is guaranteed only as n tends to infinity. The results of large-scale wireless network, however, may not be always applicable to small-scale networks that can have irregular topologies.

Secure minimum-energy routing with the aid of FJ was investigated in [6c], [7c] for a small-scale network. The objective is to compute a minimum-energy path subject to constraints on the end-to-end communication secrecy and the throughput over the path. The authors proposed a power allocation scheme to assign FJ power required to secure individual links. The secure routing problem was reduced to finding a path with the minimum total information and FJ power. Each link was studied independently, assuming that it can be secured by its own set of FJ devices, and there is a discrete set of eavesdropping locations, each with a given probability of eavesdropping in that location. These works, although applicable to small-scale networks, do not jointly consider the optimal placement and power allocation of the FJ devices. Moreover, they do not exploit the FJ devices associated with a given link to help in providing secrecy for another link, which can reduce the total jamming power. Finally, they assume that the FJ signals are nullified at legitimate receivers, but the conditions needed to ensure such nullification are not incorporated in the formulation. This undermines the applicability of their designs.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention considers a network of two or more interfering multiple-input single-output (MISO) links in the presence of an eavesdropper. The approach is based on pricing, a well-known concept in game theory. Contrary to intuition, the present invention teaches that if a user reduces their own friendly jamming power, the sum of the secrecy rates of all users can actually be improved. The reduction in jamming power must be done in such a way that interference at legitimate receivers is reduced, but the aggregate interference at external eavesdroppers still remains high. Without loss of generality, the resource-efficient distributed friendly jamming (FJ) system of the present invention may comprise two or more wireless links, where each wireless link independently accomplishes a transmission and a reception of an information signal in the presence of one or more eavesdroppers. Each wireless link may comprise a transmitting mobile device and a corresponding receiving mobile device. These transmitting mobile devices may transmit an information signal to their corresponding receiving mobile device. Each transmitting mobile device knows the location of its corresponding receiving device. Additionally, each receiving mobile device has a secrecy rate, where the secrecy rate is a data rate at which secure transmission of the information signal is accomplished when the one or more eavesdroppers of unknown locations is present.

In further embodiments, a precoder may be embedded in each transmitting mobile device. The precoder utilizes a set of signal processing algorithms for precoding the information signal before transmission to the corresponding receiving mobile device. Each transmitting mobile device also transmits an artificial noise (AN) signal (for friendly jamming), along with the information signal, to its corresponding receiving mobile device. The precoder may be further used to precode the AN signal before transmission to the corresponding receiving mobile device. Each AN signal may be precoded such that an interference effect at the receiving mobile device is nullified, but the interference effect at other receiving mobile devices is nonzero.

Consistent with previous embodiments, for a single wireless link of the two or more wireless links in the system, as a power of the AN signal is increased at the transmitting mobile device the secrecy rate of the corresponding receiving mobile device is also increased. This increase in power causes a decrease in the secrecy rate of other wireless links in the system. Thus, a penalty (price) is imposed on each transmitting mobile device when sending an AN signal to the corresponding receiving mobile device. A higher penalty is required from the transmitting mobile device for increasing the power of the AN signal transmitted to the corresponding receiving mobile device. Thus, each transmitting mobile device competes to maximize a utility function, where the utility function is the secrecy rate (within a given wireless link) minus the price paid for generating the AN signal. At equilibrium, a reduction in the power of the AN signal increases the sum of the secrecy rates of the other receiving devices in the system.

In some embodiments, each transmitting mobile device may have two or more antennas and each corresponding receiving mobile device may have one or more antennas. Each transmitting mobile device may simultaneously transmit the information signal and the AN signal, via the two or more antennas, to the corresponding receiving mobile device. The corresponding receiving mobile device may receive the information signal and the AN signal via the one or more antennas.

Additional embodiments feature a precoder precoding the AN signal such that: the AN signal at the corresponding receiving mobile device is zero, the AN signal at other receiving mobile devices within the system is reduced, and the AN signal at unintended receiving devices (of the one or more eavesdroppers) is maximized.

Previous embodiments have detailed a price-based jamming control that imposes a penalty on transmitting mobile devices when sending an AN signal to its corresponding receiving mobile device. Increasing the power of an AN signal in a single wireless link causes a decrease in the secrecy rates of other wireless links in the system. Traditional solutions employ greedy friendly jamming to determine the optimal power for each transmitted AN signal. Greedy friendly jamming allows each user (transmitting mobile device) to maximize its own secrecy rate and ignore the effects of its friendly jamming on other users. The present invention shows that greedy friendly jamming is not an optimal approach to realize a secure network. Simulations of the price-based jamming control of the present invention identify a local optimum for the secrecy sum-rate and have demonstrated a noticeable improvement in the secrecy sum-rate using the price-based in jamming control.

The present invention further features a block fading broadcast channel with a multi-antenna transmitter sending two or more independent confidential data streams to two or more legitimate users in the presence of a passive eavesdropper. The transmitter may use MIMO precoding to generate the two confidential information signals along with its own (transmitter-based) friendly jamming (artificial noise). To enhance secrecy rates, the two or more legitimate users also employ their own (receiver-based) friendly jamming. An exemplary embodiment of the integrated transmitter-based and receiver-based friendly jamming system may comprise a transmitting mobile device and two or more receiving mobile devices, where the transmitter device may have three or more antennas and the receiving device may have one or more antennas. Additionally, the channel conditions for each of the two or more receiving mobile devices is known to the transmitting mobile device. A self-interference cancellation module embedded in each receiving mobile device may further comprise the system. This cancellation module operates to allow each receiving mobile device to transmit a friendly jamming (AN) signal while simultaneously receiving an information signal.

Some embodiments feature a transmitter precoder, embedded in the transmitting mobile device, utilizing a set of signal processing algorithms to precode the information signal before transmission to the two or more receiving mobile devices. The information signal is precoded such that it is cancelled out at all unintended receiving mobile devices. The transmitter precoder may also use the signal processing algorithms to precode the transmitter-based AN signal such that it is cancelled out at each of the two or more receiving mobile devices. Additionally a receiver precoder, embedded in each of the two or more receiving mobile devices, may precode a receiver-based AN signal at each receiving mobile device. Power control schemes are also utilized at the transmitting and receiving mobile devices.

Consistent with previous embodiments, the three or more antennas of the transmitting mobile device may be jointly used to simultaneously transmit an information signal and a transmitter-based AN signal to any receiving mobile device in the system. To illustrate, the three or more antennas of the transmitting mobile device are jointly used to simultaneously transmit a first information signal and the transmitter-based AN signal to a first receiving mobile device of the two or more receiving mobile devices. The three or more antennas of the transmitting mobile device are then jointly used to transmit a second information signal and the transmitter-based AN signal to a second receiving mobile device. Further, the one or more antennas of each receiving mobile device may be used to receive an intended information signal along with the transmitter-based AN signal, where the transmitter-based AN signal is cancelled out by each corresponding receiving device. Receiver antennas may also transmit an AN signal. The self-interference cancellation module enables the receiving mobile devices to simultaneously transmit the receiver-based AN signal and receive transmitted signals. Additionally, the receiver-based AN signal may be precoded by a receiver precoder such that the receiver-based AN signal cancels out at every other (legitimate) receiving mobile device in the system.

Previous embodiments considered the case where a transmitter sends two or more independent confidential data streams to legitimate users in the presence of an eavesdropper at an unknown location. Since security applications require guard zones around receivers up to 19 wavelengths, a receiver (Rx) based artificial noise (friendly jamming, FJ) signal along with a transmitter (Tx) based FJ signal were employed. In this way, even if an eavesdropper has a highly correlated channel (with any legitimate receiver) and is able to cancel out the Tx FJ signal, the Rx FJ signal provides confidentiality for the information signals. The Tx FJ signal is still needed because a transmitter generally has much more power than mobile receiver devices. Therefore, it can provide security over a larger area.

The zero-forcing technique was used in the present invention to not only remove the Tx FJ interference at intended receivers but also to hide the information signals from unintended receivers. An optimization problem was formulated for the power allocations of two information signals, the Tx FJ signal, and two Rx FJ signals with the goal of maximizing the secrecy sum-rate of the system. Assuming that the legitimate links demand a certain signal to interference noise ratio (SINR) such that their achieved data rates remain constant (and they achieve no data rate below this SINR threshold) an optimal solution was provided.

The present invention further features a small-scale, multi-link wireless network (e.g., peer-to-peer or multihop) and jointly optimizes the powers and locations of multiple friendly jamming devices so as to minimize the total jamming power while simultaneously achieving a given secrecy constraint. One embodiment uses distributed MIMO techniques and incorporates the necessary conditions to ensure nullification of the friendly jamming signals at legitimate receivers. An exemplary embodiment of the efficient friendly jamming system for multi-link wireless networks may comprise a plurality of wireless mobile devices having one or more antennas and a plurality of wireless FJ devices configured to transmit an AN signal. In some embodiments, each wireless mobile device may generate one or more information packets, receive one or more information packets, or relay one or more information packets to one or more of the other wireless mobile devices in the system. In a further embodiment, a transmission power of each AN signal is controlled by the wireless FJ device transmitting said AN signal. Additionally, each AN signal may be jointly precoded such that they are all cancelled out at each wireless mobile device in the system.

In another embodiment the location of each wireless FJ device comprises a set of locations and the transmit power of each wireless FJ device comprises a set of transmit powers. The set of locations and the set of transmit powers may be optimized to minimize power consumption while guaranteeing a desired bound on end-to-end security of transported flows. Further, each wireless mobile device may individually generate an AN signal (transmitter or receiver based) to protect the one or more information signals against one or more eavesdroppers.

Previous embodiments of the present invention exploited friendly jamming for security in small-scale multi-link wireless networks in the presence of eavesdroppers. The powers and locations of the friendly jamming devices were optimized so as to minimize the total jamming power required to secure legitimate transmissions. Distributed MIMO techniques were used to nullify the friendly jamming signals at legitimate receivers. A signomial programming problem was formulated and approximated as a convex geometric programming problem using condensation techniques. Two optimization strategies were then proposed: per-link and network-wide (all links jointly). It was demonstrated that the per-link scheme of the present invention outperforms previous schemes in terms of energy efficiency (55-99 percent power saving). Moreover, the network-wide optimization was shown to be more energy-efficient than per-link scheme (29-30 percent additional power saving) and also requires about half the number of friendly jamming devices than per-link optimization. For multihop scenarios, a routing metric that finds a secure path that requires minimal jamming power was proposed.

BRIEF DESCRIPTION OF THE DRAWINGS

FIGS. 5A and 5B each depict an exemplary effect of Eve's location on individual secrecy sum-rates. The configurations are the same as FIG. 4.

FIG. 6 depicts an exemplary effect of Eve's location on secrecy sum-rate, wherein the configuration is $\{(\varphi_q=\frac{1}{3}, \text{Alice}_1=(-40,20), \text{Bob}_1=(40,20), \text{Alice}_2=(-40,-20), \text{Bob}_2=(40,-20), \hat{y}_e=25, \hat{r}_e=20, P_q=10 \text{ dBm}, N_{T_q}=3 \ \forall q\}$.

DESCRIPTION OF PREFERRED EMBODIMENTS

Referring now to FIGS. 1-7, the present invention features a price-based distributed friendly jamming system for wireless communications security. The system may comprise at least two transmitting mobile devices, each transmitting mobile device comprising at least two transmit antennas, and at least two receiving mobile devices. In some embodiments, each receiving mobile device communicates with the corresponding transmitting mobile device. The transmitting mobile device may know the location of the corresponding receiving mobile device. In other embodiments, each receiver has a secrecy rate, which is the data rate at which secure transmission can be received, assuming the presence of an unknown eavesdropper.

In one embodiment, each transmitting mobile device can transmit an information signal intended for the corresponding receiving mobile device along with a signal of artificial noise. Preferably, the direction of the artificial noise is such that the artificial noise is zero at a location of the receiving mobile device, and the artificial noise is non-zero at locations of any other receiving device. In another embodiment, an interference at other receivers is increased when a power of the artificial noise signal increases. The secrecy rate at the corresponding receiver may be increased with the power of the artificial noise signal and the interference may reduce the secrecy rate at the other receivers.

In some embodiments, a penalty (price) is charged for increasing the power of artificial noise. The transmitters may compete to optimize a utility function of the corresponding receiver's secrecy rate minus the price paid for generating artificial noise. At equilibrium, a reduction in noise power can increase the sum of all secrecy rates. The overall goal of the pricing approach is to regulate the amount of artificial noise power used by transmitting devices such that the sum of secrecy rates of all legitimate links in the network is maximized. Such maximization is strictly in the direction of reducing interference at legitimate receivers and increasing it at eavesdropper(s).

Figure 1:
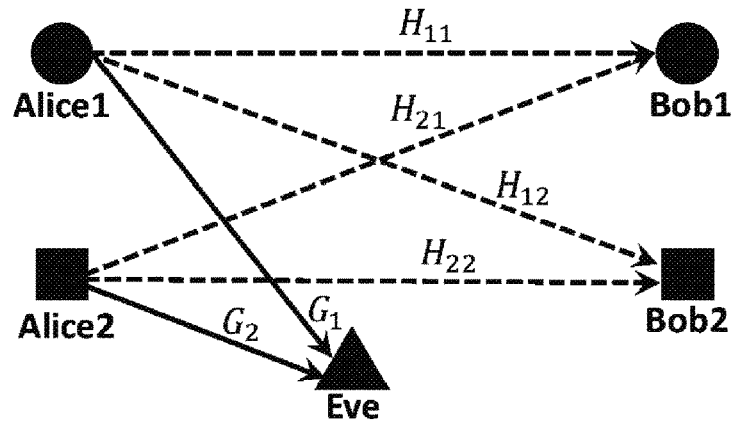
FIG. 1 shows an exemplary system model according to an embodiment of the present invention.

Without any loss of generality, in the following, the case of two legitimate multi-antenna transmitters communicating with two respective receivers in the presence of a single-antenna eavesdropper is described. Each receiver is equipped with a single antenna. Extensions to more than two receivers, multiple antennas per receiver, and multiple eavesdroppers are straightforward. As shown in FIG. 1, multiple transmitters and receivers operate within the same geographic locality in the presence of an eavesdropper. Alice1 is attempting to transmit to Bob1 and Alice2 is attempting to transmit to Bob2, while Eve is eavesdropping. Both Alice1 and Alice2 have at least two antennas. The transmitted signal includes both information signal added by artificial noise. $H_{11}$, $H_{12}$, $H_{21}$, and $H_{22}$ are channel matrices that transform the signal between the transmitters and both receivers. These matrices are dependent on the location of the receivers and are known to the transmitters. Alice1 pre-codes the artificial noise signal such that the artificial noise is canceled out by the $H_{11}$ channel matrix and becomes zero at Bob1's location. Alice2 pre-codes the artificial noise signal such that the artificial noise is canceled out by the $H_{22}$ channel matrix and becomes zero at Bob2's location. Neither artificial noise signal is cancelled out at Eve's location. However, the artificial noise from Alice1 is not canceled out at Bob2's location and vice versa, which causes interference with the legitimate reception of Bob1 and Bob2. Increasing the signal strength of the artificial noise at one link may create more security for the Alice1-Bob1 link but degrades signal reception of the other link, which leads to suboptimal performance of the overall system. The present invention may comprise applying a price to adjust the artificial noise signal strength in Alice1 and Alice2 so as to maximize the sum of secrecy rates in the network. Applying the pricing scheme is done by modifying the secrecy-rate function at the respective receivers. Hence, each link attempts to maximize a function of the secrecy-rate at the respective receivers, minus the cost of the artificial noise power. Alice1 and Alice2 each are able to compute the secrecy-rate, which depends on Eve's location. Such a design helps nodes regulate their artificial noise powers in a way that interference at legitimate nodes is decreased, and yet the sum of secrecy rates of both links is maximized. Since Eve is closer to one transmitter then the other, the function will be optimized at different power levels for each receiver. For example, if Eve is closer to Alice2 than Alice1, as shown in FIG. 1, then Alice1 can reduce the power level of its artificial noise signal without degrading the secrecy rate at Bob1. This improves the secrecy-rate at Bob2, thus leading to a more optimal system-wide performance.

Figure 8:
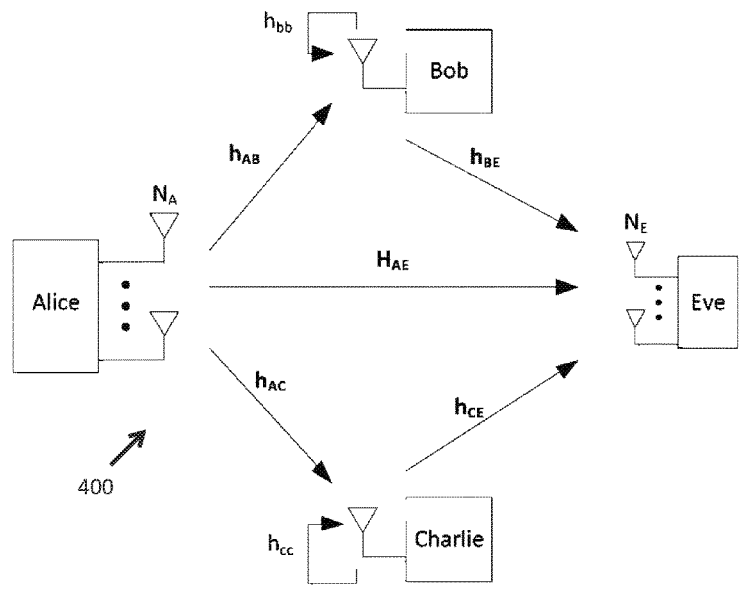
FIG. 8 shows an exemplary system model with both TxFJ and RxFJ.

Referring to FIGS. 8-13, another embodiment of the present invention features a receiver-based friendly jamming system. The system may comprise at least one transmitting mobile device comprising at least three transmit antennas, and at least two receiving mobile devices. In some embodiments, each receiving mobile device may comprise one or more antennas with the capability of full-duplexity. Note that FIG. 8 shows a sample scenario with two receiving mobile devices, each having a single antenna. Instead of labeling these devices Bob1 and Bob2, they are labeled Bob and Charlie to make the notation easier. Hereafter, the present invention will be analyzed for this sample scenario. The transmitting mobile device can communicate with the receiving mobile devices. The transmitting mobile device can also know the locations of the receiving mobile devices.

In one embodiment, the transmitting mobile device may transmit independent information signals to the first and the second receiving mobile devices. The information signals are pre-coded to cancel out at other receiving devices.

In some embodiments, the transmitting mobile device may transmit an artificial noise signal. The artificial noise signal is pre-coded to cancel out at a location of each receiving mobile device. In other embodiments, the receiving antenna of each receiving mobile device receives the information signal. In still other embodiments, each receiving mobile device transmits an artificial noise signal. The receiving mobile device may use the same antenna to concurrently transmit artificial noise and receive the information message over the same channel.

As shown in FIG. 8, Alice attempts to transmit information signals to Bob and Charlie in the presence of an eavesdropper Eve. Alice knows the channel states at Bob and Charlie, i.e., channel vectors $h_{AB}$ and $h_{AC}$. The information signal to Bob is pre-coded to cancel out at Charlie's location and vice versa. In addition to the two information signals transmitted to Bob and Charlie, Alice transmits a pre-coded artificial noise signal, which is pre-coded to cancel out at the locations of both Bob and Charlie. As an additional layer of security, the present invention comprises the receivers emitting an additional artificial noise signal.

Referring to FIGS. 14-21, a further embodiment of the present invention features an efficient, friendly jamming system for multi-link wireless networks. The system may comprise a plurality of wireless mobile devices, each having a mobile device location, and a plurality of wireless friendly-jamming (FJ) devices. Each friendly jamming device may transmit an artificial noise signal and may have an FJ device location and a power allocation. In some embodiments, the artificial noise signals of the FJ devices are jointly pre-coded to produce null spaces of the artificial noise signal at the locations of the wireless mobile devices. Preferably, the FJ device locations and joint power allocations of the FJ devices are jointly optimized to minimize power consumption under a secrecy constraint.

Figure 14:
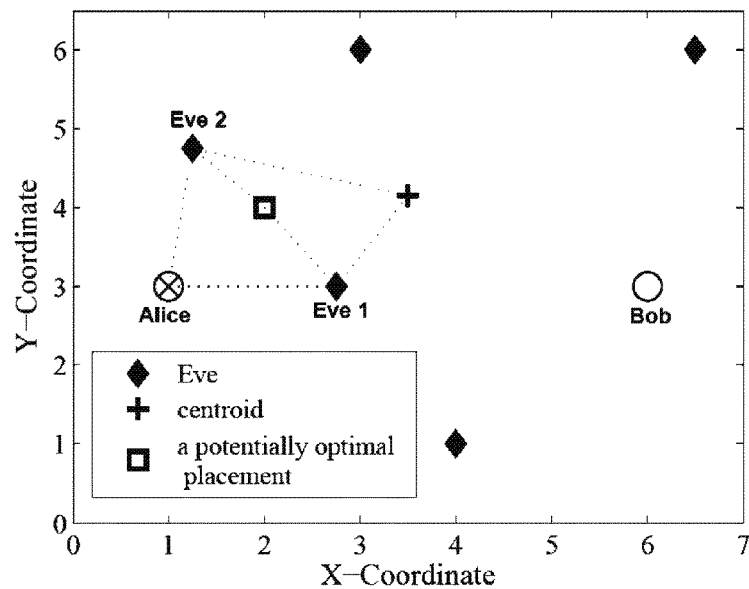
FIG. 14 depicts placements of single-antenna FJ devices (without nullification constraints.) Jamming power is a function of distances to and received information signals at each Eve.
Figure 15:
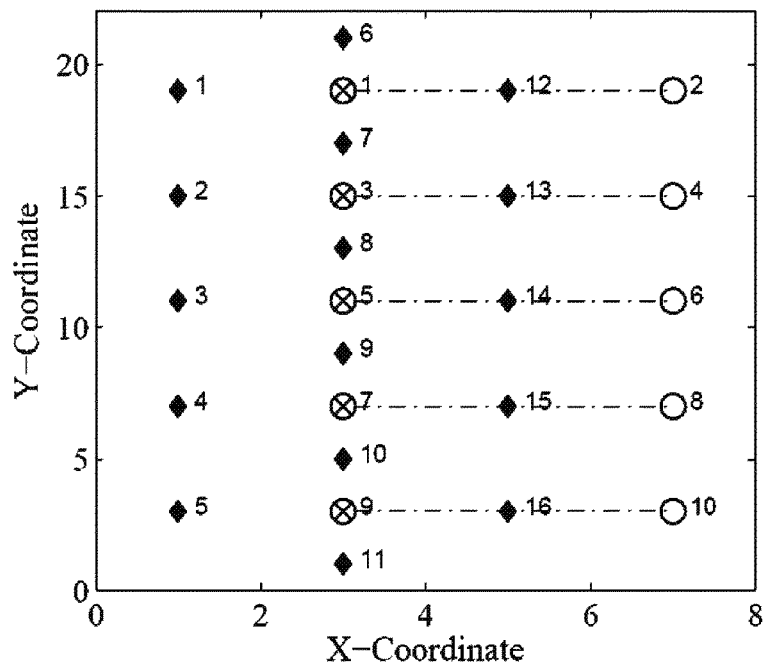
FIG. 15 shows an exemplary network topology for the case of five P2P links. Hollow circles, crossed circles, and diamonds represent receivers, transmitters, and potential eavesdropping locations.

As shown in FIG. 14, Alice (circle and x) attempts to transmit an information signal to Bob (marked by circle), in the presence of multiple eves droppers (Eve1 and Eve2). An independent friendly jamming device (square) is placed somewhere in the field, and emits an artificial noise signal. The position of the jamming device and the power allocation is optimized to minimize jamming power consumption under the constraint of a minimum requirement for the secrecy-rate at Bob, which is dependent on the FJ power seen by all eavesdroppers. (i.e. more noise at Eve obscures the information signal increasing Bob's secrecy rate).

Figure 17:
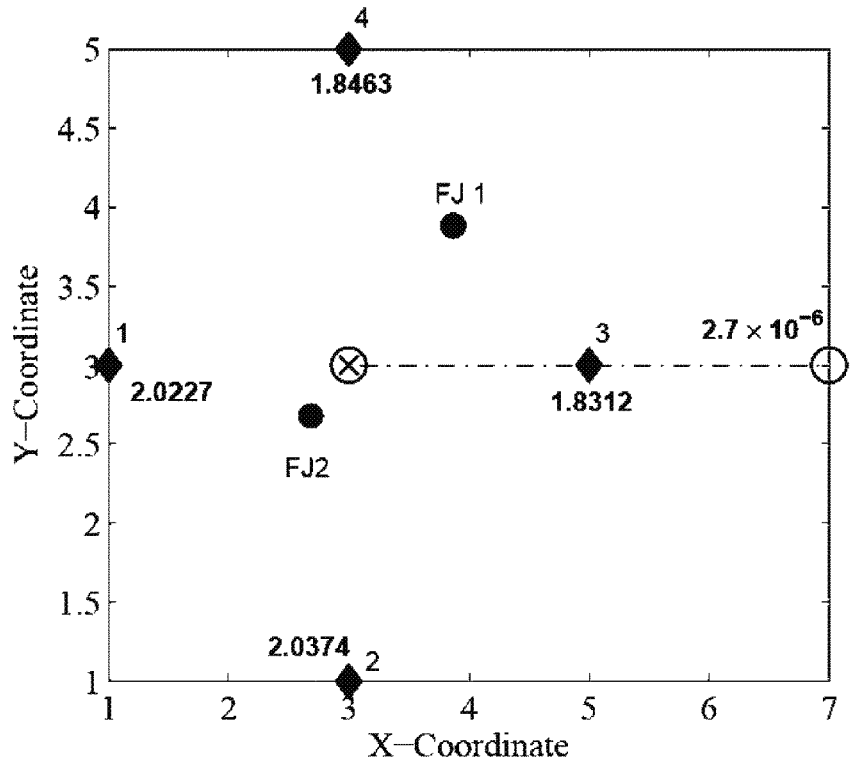
FIG. 17 depicts an exemplary outcome of the proposed per-link scheme for the one-link case. The hollow, crossed, and solid circles represent the locations of Bob, Alice, and the FJ nodes, respectively.

Referring to FIG. 17, a second example of an efficient friendly jamming system for multi-link mobile wireless network is shown. In this example, there are four eavesdroppers (1,2,3,4) and two FJ devices (FJ1, and FJ2). The FJ devices emit noise that is canceled out at Bob (circle), but not at the eavesdropper's locations.

As used herein, the following notation is adopted. Vectors and matrices are denoted by bold lower-case and uppercase letters, respectively. Column and row vectors notations are used interchangeably. $(\cdot)^\dagger$ and $(\cdot)^T$ represent the complex conjugate transpose and the transpose of a vector or matrix, respectively. Frobenius norm and the absolute value of a real or complex number are denoted by $\|\cdot\|$ and $|\cdot|$, respectively. $\mathbb{E}[\cdot]$ indicates the expectation of a random variable. $A \in \mathcal{C}^{M \times N}$ means that A is an M×N complex matrix. $(\mu, \sigma^2)$ denotes a complex Gaussian random variable with mean $\mu$ and variance $\sigma^2$. $I_N$ represents an N×N identity matrix. $[x]+=x$ for $x>0$, and $[x]+=0$ for $x \le 0$.

Example 1

The following is a non-limiting example of a price-based jamming control that can guarantee a local optimum for secrecy sum-rate.

System Model

A communication scenario is shown in FIG. 1, where two transmitters, Alice1 and Alice2 communicate with two respective receivers, Bob1 and Bob2. Each transmitter (TX) q, q=1, 2, has $N_{T_q}$ transmit antennas. A passive eavesdropper (i.e., Eve) with one antenna exists in the range of communication. The received signal by the qth receiver, $y_q$, can be written as:

$$y_q = \tilde{H}_{qq} u_q + \tilde{H}_{rq} u_r + n_q, \quad r, q \in \{1,2\}, r \ne q \quad (1a)$$

where $H_{qT}$ denotes the $1 \times N_{T_q}$ channel matrix between the qth transmitter and the rth receiver, $u_q$ is the transmitted signal from the qth transmitter, and $n_q$ is the complex Additive White Gaussian Noise (AWGN) with the power $N_0$. We assume that $H_{qT}$ is a zero mean complex Gaussian matrix. Let $G_q$ denote the $1 \times N_{T_q}$ complex channel matrix between the qth transmitter and Eve. Eve's received signal is $$z = \tilde{G}_a u_a + \tilde{G}_r u_r + e \quad (2a)$$

where e has the same characteristics of $n_q$. We assume that channels remain stationary over the duration of each transmission. The term $u_q = s_q + w_q$ is the sum of an information bearing signal $s_q$ and artificial noise $w_q$. For the AN, we write it as $w_e = Z_q v_q$, where $Z_q$ is an orthonormal basis for the null space of $H_{qq}$ ($H_{qq} w_q = 0$) and $v_q$ is a vector of i.i.d. complex Gaussian random variables with covariance matrix $$E[v_q v_q^H] = \sigma_q I_{N_{T_q}-1}$$

where E[.] is the expectation operator. In here, the scalar value denotes the jamming power and $I_N$ is the N×N identity matrix. For the information bearing signal, $s_q = T_q x_q$ where $T_q$ is the precoder and $x_q$ is the information signal. We assume that Gaussian codebook is used, Furthermore, Let $X_q = tr\{E[x_q x_q^H]\}$ and assume that $X_q \le p_q$ where tr[.] is the trace operator, $(.)^H$ is the Hermitian of a matrix, and $p_q$ is a scalar representing a constraint on information signal's power. The power constraint for each transmitter q is written as $$E[|u_q|^2]=tr\{E[u_q u_q^H]\} \le P_q, \quad (3a)$$

Thus, $$tr\{E[v_q v_q^H]\}+X_q \le P_q \quad (3b)$$

where $P_q=\sigma_q(N_{T_q}-1)+p_q$ is a scalar value that represents the total power budget for the qth transmitter. We assume that qth receiver is able to estimate the channel $H_{qq}$ and feed it back to the qth transmitter, q=1, 2. Note that the process of acquiring channel state information (CSI) is assumed to be done securely, so that we can only focus on the secrecy of transmission phase. With the knowledge of $H_{qq}$, the transmitter uses singular value decomposition of $\tilde{H}_{qq}$, $\tilde{H}_{qq}=U_q \Sigma_q V_q^H$. Hence, the precoder $T_q$ is set to $T_q = V_q^1$, where $V_q^1$ is the first column of $V_q$ and $Z_q = V_q^2$, where $V_q^2$ is the matrix of $N_{T_q}-1$ rightmost columns of $V_q$.

Problem Formulation

Given that $\tilde{H}_{qq}V_q^2 = 0$, we set $H_{qq}=\tilde{H}_{qq}V_q^1$, $H_{qr}=\tilde{H}_{qr}V_q^1$, $H_{jq}=\tilde{H}_{qr}V_q^2$, $G_q=GqVq1$, $Gjg=GqVq2$. For q=1,2, the terms $G_q$ and $G_{iq}$ are called the eavesdropping channel components. Hence, $$y_q = H_{qq}x_q + H_{rq}x_r + H_{jr}v_r + n_q \quad (4a)$$

$$z_q = G_q x_q + G_{jq}v_q + G_r x_r + G_{jr}v_r + e_q. \quad (5a)$$

The information rate for the qth user can be written as $$C_q = \log\left(1 + \frac{|H_{qq}x_q|^2}{|H_{rq}x_r|^2 + |H_{jr}|^2 \sigma_r + N_0}\right) \quad (6a)$$

Figure 2:
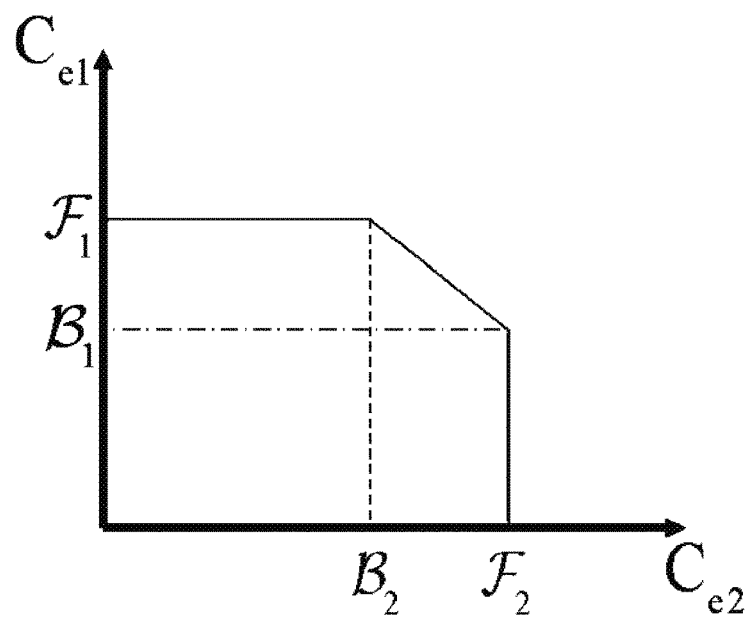
FIG. 2 shows a non-limiting example of achievable rate pairs for a two-user multiple access channel.

The channel between the two Alices and Eve can be modeled as a multiple-access channel, since Eve is simultaneously receiving signals from both Alices. If Eve is capable of using successive interference cancellation (SIC) technique, it can simultaneously decode the signals from both Alices. The achievable-rate region of Eve's multi-access channel is shown in FIG. 2. $C_{eq}$ denotes the achievable rate at Eve while decoding the qth user's signal, where q=1,2. The points $B_q$ and $F_q$ are defined in the following. FIG. 2 suggests that to prevent Eve from using SIC, we must have $C_q > B_q$ [12a], i.e., $$\log\left(1 + \frac{|H_{qq}x_q|^2}{|H_{rq}x_r|^2 + |H_{jr}|^2 \sigma_r + N_0}\right) > \mathcal{B}_q \quad (7a)$$

where $$\mathcal{B}_q = \log\left(|1 + \frac{|G_q x_q|^2}{|G_{jq}|^2 \sigma_q + |G_r x_r|^2 + |G_{jr}|^2 \sigma_r + N_0}\right), \forall q. \quad$$

If inequality (7a) is satisfied, then Eve has to decode the signal of the rth user by considering the signal of the qth user as interference. Thus, the achievable rate received at Eve is $C_{er}=B_r$ and the secrecy rate of the rth user would be $$C_r^{sec} = \max\{C_r - C_{cr}, 0\} = \log\left(1 + \frac{|H_{rr}x_r|^2}{|H_{qr}x_q|^2 + |H_{jq}|^2 \sigma_q + N_0}\right) - \log\left(1 + \frac{|G_r x_r|^2}{|G_{jr}|^2 \sigma_r + |G_q x_q|^2 + |G_{jq}|^2 \sigma_q + N_0}\right), r \ne q. \quad (8a)$$

If (7a) is not satisfied, Eve considers the signal of the rth user as interference and decodes the signal of the qth user. Knowledge of the qth user's signal allows Eve to deduct the qth user's signal from the received signal and obtain an interference-free signal from the rth user. Hence, $C_{er}=F_r$ and the secrecy rate of the rth user would be $$C_r^{sec} = \max\left\{\log\left(1 + \frac{|H_{rr}x_r|^2}{|H_{qr}x_q|^2 + |H_{jq}|^2 \sigma_q + N_0}\right) - \mathcal{F}_r, 0\right\} \quad (9a)$$

$$\mathcal{F}_r = \log\left(1 + \frac{|G_r x_r|^2}{|G_{jq}|^2 \sigma_q + |G_{jr}|^2 \sigma_r + N_0}\right). \quad (10a)$$

It is obvious from (7a) and (9a) that in order to achieve the maximum secrecy, the two users have to choose a transmission rate higher than Eve's decodable rate. As can be seen in (8a), the interference caused by the friendly jamming signal can degrade the received signal to interference and noise ratio (SINR) at unintended receivers. On the contrary, the sum of interference accumulated at Eve can ensure low SINR at Eve. The degradation of both information rate and Eve's rate creates a conflicting situation. The performance of the network is comprised of the performance of both users. Hence, we define the term secrecy sum-rate to be $$C^{sec} = C_1^{sec} + C_2^{sec}. \quad (11a)$$

We want to maximize $C^{sec}$ while ensuring a minimum QoS for both users. This problem can be formally written as:

$$\underset{\{X_1,X_2,\sigma_1,\sigma_2\}}{\text{maximize}} \quad C^{sec} \quad (12a)$$

$$\text{s.t.} \begin{cases} X_q + \sigma_q(N_{T_q}-1) \le P_q \\ C_q \ge c_q \end{cases}, \forall q \in \{1, 2\}$$

where the second constraint ensures a minimum QoS (i.e., $c_q$) for each user. The optimization in (12a) is non-convex. Thus, finding its optimum is prohibitively expensive. One relaxation to this problem is to eliminate the dependency of the problem on $X_1$ and $X_2$. We assume that the minimum QoS constraint, is satisfied with equality. Hence, $C_q = c_q$ which can be reduced to a relation in the form of $X_q = \gamma_q$ where $\gamma_q \le p_q$, q=1,2. By doing so, the second constraint can be embedded into the objective function and the first constraint. Hence, we have $$\underset{\{\sigma_1,\sigma_2\}}{\text{maxmize}} \quad C^{sec} \quad (13a)$$

$$\text{s.t.} \quad \sigma_q \le \frac{P_q - \gamma_q}{N_{T_\sigma}-1}, \forall q \in \{1, 2\}.$$

Note that $p_q = \phi_q$ and $\sigma_q(N_{T_q}-1) = (1-\phi)P_q$ where $\phi_q$ is a scalar variable within the interval [0,1] representing the proportion of power allocated to the information signal and to the AN. We also note that the jamming power has to be chosen such that inequality (7a) is satisfied. Reducing (7a), we have $$\sigma_q > \frac{A_q}{B_q}, \tag{14a}$$

where $$A_q = |G_q|^2 \gamma_q (|H_{rq}|^2 \gamma_r + |H_{j_r}|^2 \sigma_r + N_0) - \tag{15a}$$
$$|H_{qq}|^2 \gamma_q (|G_r|^2 \gamma_r + |G_{j_r}|^2 \sigma_r + N_0),$$
$$B_q = |G_{jq}|^2 |H_{qq}|^2 \gamma_q.$$

Simplifying (14a), we have the following constraint for $\sigma_q$:

$$\sigma_q = \frac{P_q - p_q}{N_{T_q} - 1} \text{ if } \frac{A_q}{B_q} > \frac{P_q - p_q}{N_{T_q} - 1} \tag{16a}$$

$$\sigma_q > \frac{A_q}{B_q} \text{ if } A_q > 0 \ \& \ \frac{A_q}{B_q} < \frac{P_q - p_q}{N_{T_q} - 1}, \tag{17a}$$

$$\sigma_q > 0 \text{ if } A_q < 0. \tag{18a}$$

For the case in (16a), no power can prevent Eve from using SIC to decode two information messages, and the solution to (13a) would be infeasible. Hence, we assume that if (16a) is true for any of the users, they will not start any communications. Considering that we always have either of (17a) or (18a), the optimization in (13a) becomes $$\underset{\{\sigma_1, \sigma_2\}}{\text{maximize}} \ C^{sec} \tag{19a}$$
$$\text{s.t. } \sigma_q \in D_q, \forall q \in \{1, 2\}$$

where $$D_q \triangleq \left[ \max\left\{\frac{A_q}{B_q}, \Delta\sigma_q\right\}, \frac{P_q - p_q}{N_{T_q} - 1}\right] \text{ and } [a, b]$$

represents an interval between a and b.

Since the inequality in (18a) strictly suggests that the jamming power has to be positive, we set $\Delta\sigma_q$ to be the smallest positive value in the $D_q$. The optimization in (13a) tries to find the best trade-off between the jamming powers of the two users, In other words, the Pareto-optimal jamming powers can be found by solving (13a). Unfortunately, the optimization in (13a) is still non-convex. Furthermore, it requires the exact knowledge of the eavesdropping channel components.

Game Formulation

1. Greedy Friendly Jamming:

One solution to reduce the complexity of (13a) is to let each user maximize its own secrecy rate and ignore the effect of its friendly jamming on the other user. This locally optimized jamming control leads to a game theoretic interpretation of this network. Assuming that each user myopically chooses the best strategy for itself, we formulate this scenario as a non-cooperative game, in which the best strategy of each user q, q=1,2 is $$\underset{\sigma_q}{\text{maximize}} \ C_q^{sec} \tag{20a}$$
$$\text{s.t. } \sigma_q \in D_q.$$

In this game, the utility function of each player (user) is its secrecy rate and his strategy is to choose the best jamming power subject to the jamming power constraint (i.e., strategy set) to maximize its utility. The existence of Nash equilibrium (NE) in this game can be proven by showing that the strategy set of each user is a non-empty, compact, and convex subset of $\mathbb{R}$, and the utility function of each user is a continuous and quasi-concave function of the jamming power. Verifying these properties in the game is straightforward and is skipped for brevity. Since the objective function in (20a) is strictly concave in $\sigma_q$, the best strategy that maximizes the secrecy rate of the qth user is to select the maximum available jamming power $$\left(\text{i.e., } \sigma_q = P_q^{jam} = \frac{P_q - p_q}{N_{T_q} - 1}, q = 1, 2\right).$$

Given the strategy of the user in the network, when $\sigma_q = P_q^{jam}$, $\forall q$, no user is willing to unilaterally change its own strategy because choosing any jamming power less than that can degrade the individual secrecy rate of that user. Therefore the point $\sigma_q = P_q^{jam}$, $\forall q$ is the NE. This result is in line with [4a] for the single-user case.

This NE point, however, might not always be efficient, because the selfish maximization of secrecy rate by each user is not always guaranteed to be Pareto-optimal. As an intuitive explanation, consider the case where the interference from Alice2 is large enough to affect Bob1, but Eve is much closer to Alice1 than to Alice2. Considering almost equal jamming power constraints, if both users select the maximum jamming power, Alice1 can make its transmission more secure by applying maximum jamming power. However, although Alice2 is not that much in the risk of being eavesdropped, it chooses maximum jamming power which has little impact on its own secrecy rate, but can degrade the received SINR at Bob1. Degradation of $C_1$ makes the transmission of Alice1 less secure, so the secrecy sum-rate of the network will be reduced.

2. Price-Based Friendly Jamming:

The efficiency of the NE in greedy friendly jamming can be improved by using appropriate pricing policies. Hence, for q∈{1,2}, the objective function of player q in (20a) is modified into:

$$\underset{\sigma_q}{\text{maximize}} \ C_q^{sec} - \lambda_q \sigma_q \tag{21a}$$
$$\text{s.t. } \sigma_q \in D_q$$

where $\lambda_q$ is the pricing factor for the qth user, defined in (22a).

$$\lambda_q = \frac{|H_{j_q} H_{rr}|^2 \gamma_r}{(|H_{qr}|^2 \gamma_q + |H_{j_q}|^2 \sigma_q + N_0)} - \qquad (22a)$$

$$(|H_{qr}|^2 \gamma_q + |H_{j_q}|^2 \sigma_q + |H_{rr}|^2 \gamma_r + N_0)$$

$$\frac{|G_{j_q} G_r|^2 \gamma_r}{(|G_q|^2 \gamma_q + |G_{j_q}|^2 \sigma_q + |G_{j_c}|^2 \sigma_r + N_0)},$$

$$(|G_q|^2 \gamma_q + |G_{j_q}|^2 \sigma_q + |G_r|^2 \gamma_r + |G_{j_r}|^2 \cdot \sigma_r + N_0)$$

$$r \neq q, (r, q) \in \{1, 2\}^2.$$

$$\sigma_q^* = \left[ \frac{1}{|G_{j_a}|^2} \left( \sqrt{|G_q G_{j_q}|^2 \frac{\gamma_q}{\lambda_q} + \frac{|G_q|^4 \gamma_q^2}{4}} - \right. \right. \qquad (23a)$$

$$\left. \left. \frac{|G_q|^2 \gamma_q}{2} - (|G_r|^2 \gamma_r + |G_{j_r}|^2 \sigma_r + N_0) \right) \right]_{\chi_q}^{\frac{P_q - p_q}{N_{T_q} - 1}}$$

The rationale behind pricing has been discussed in many works (e.g., [6a], [19a], [20a]). In principle, pricing is a mechanism that incentivizes players to spend their jamming power more wisely by charging each user a price per unit of jamming power, thus discouraging users from acting self-ishly. In the present invention, a linear pricing will be used to improve the efficiency of jamming control. The optimal jamming power can be found by writing the K.K.T conditions for (21a). Hence, close-form representation of the optimal jamming power for the qth user can be written as (23a), where $[\ldots]_b^a \triangleq \min\{\max\{\ldots, b\}, a\}$ and $\chi_q \triangleq \min\left\{\max\left\{\frac{A_q}{B_q}, \Delta\sigma_q\right\}, P_q^{jam}\right\}$.

It is easy to verify that by setting $\lambda_q=0$, we end up with the previously mentioned greedy friendly jamming.

Using (23a) iteratively in setting the jamming power for both users leads to a convergence point (i.e., NE) from which neither user is willing to deviate. In what follows, we further explain the feasibility of converging to a NE using pricing. The following theorem clarifies the reason for setting the pricing factor as in (22a).

Theorem 1.

The NE of the game wherein the users use (22a) as the pricing factor to solve the optimization in (21a) equals to that of a locally optimal solution of (19a).

Next, we introduce two properties of pricing mechanism.
Proposition 1.

The greedy friendly jamming can increase both users' secrecy rates (i.e., it is optimal) if $\lambda_q \leq 0$, $\forall q \in \{1,2\}$.
Proposition 2.

If $\lambda_q > 0$, the NE tuple of jamming powers $(\sigma_1, \sigma_2)$ will be one of the following forms:

$$(\sigma_1, \sigma_2) = (\sigma_{int}, \chi_2) \text{ or } (\sigma_{int}, P_2^{jam}) \text{ or } (\chi_1, \sigma_{int}) \text{ or } \qquad (24a)$$

$$(P_1^{jam}, \sigma_{int}) \text{ or } (\chi_1, \chi_2) \text{ or } (P_1^{jam}, P_2^{jam}),$$

where $P_q^{jam} = \frac{P_q - p_q}{N_{T_q} - 1}$ and $\chi_q < \sigma_{int} < P_q^{jam}$.

Proof of Theorem 1: For $\sigma_q^*$ to be a locally optimal solution of (19a), K.K.T. (Karush-Kuhn-Tucker) conditions of both (19a) and (21a) must be equivalent. Hence, the optimal jamming power in (23a) is locally optimal if $$\lambda_q = -\frac{\partial C_r^{sec}}{\partial \sigma_q}, \qquad (33a)$$

which leads to setting $\lambda_q$ as in (22a). The local optimality of NE requires to prove that using (23a) converges to the NE. In proposition 2, convergence to NE is proved. Assuming that iteratively using (23a) reaches to a convergence point (i.e., NE), still the K.K.T. conditions of (21a) equals to that of (19a) which corresponds to a locally optimal solution of (19a).

Proof of Proposition 1: According to (33a), if $$\lambda_q > 0 \text{ then } \frac{\partial C_r^{sec}}{\partial \sigma_q} < 0.$$

Hence, the positive price is effective as long as the increase in one user's jamming power reduces the secrecy rate in the other. Hence, the positive price $\lambda_q$ can make a user reduce its jamming power if this reduction is beneficial for the other user. Now, considering $\lambda_q \leq 0$, the increase in one user's jamming power results in either no change (i.e., $\lambda_q=0$) or increase (i.e., $\lambda_q<0$) in the other user's secrecy rate. Therefore, whenever $\lambda_q \leq 0$ the right decision would be using maximum jamming power (i.e., setting $\lambda_q=0$) because each user can increase its own secrecy rate without reducing the secrecy sum-rate.

Proof of Proposition 2: Assume that w.l.o.g. $\chi_q$ defined in (23a), has the values $$\Delta\sigma_q < \chi_q < \frac{P_q - p_q}{N_{T_q} - 1}.$$

Furthermore, assume that the iterative use of (23a) is done sequentially, meaning that only one user is updating its jamming power at each iteration. Let the initial jamming power for the qth user be $\sigma_q^{*(1)}$, $\forall q$, where the superscript $^{(1)}$ represents the first iteration. In the next iteration, $\sigma_r$ gets updated using (23a) and $\sigma_q^{*(1)} = \sigma_q^{*(2)}$. In the third iteration, $\sigma_r^{*(2)} = \sigma_r^{*(3)}$, and $\sigma_q$ gets updated. It can be seen from (23) that $\sigma_q^*$ is a decreasing function of $\sigma_r$. Therefore, if $\sigma_q^{*(1)} < \sigma_q^{*(3)}$ the rth user will select a smaller jamming power in the fourth iteration comparing to the second iteration (i.e. $\sigma_r^{*(2)} > \sigma_r^{*(4)}$). Consequently, in the fifth iteration, the qth user selects a higher jamming power comparing to the third iteration. This trend continues until either the qth user reaches to $P_q^{jam}$ or the rth user reaches to $\chi_r$. Depending on which user reaches to either of the extreme points faster than the other, the first four forms in right hand side of (24a) are expected to be achieved. For the case of $(\chi_1, \chi_2)$ and $(P_1^{jam}, P_2^{jam})$ we first derive the price above which we always have $\sigma_q^* = \chi_q$. Let this price be $\lambda_q^1$. Reducing the inequality $\sigma_q^* \leq \chi_q$, we end up with an inequality in the form of $\lambda_q \geq \lambda_q^1$. Next, we find a price below which we have $\sigma_q^* \geq P_q^{jam}$. Let this price be $\lambda_q^2$. Reducing the inequality $\sigma_q^* \geq P_q^{jam}$, we end up with an inequality in the form of $\lambda_q^2 \geq \lambda_q$ (note that when $0 < \lambda_q \leq \lambda_q^2$, using greedy friendly jamming is optimal in terms of secrecy sum-rate, but it might not always be beneficial for both of the users unless we have $\lambda_q \leq 0$. The bound $\lambda_q \leq 0, \forall q$ found in proposition 1 can also guarantee the optimality of greedy friendly jamming in terms of individual secrecy rates). Since $\sigma_q$ is a decreasing function of $\lambda_q$, if $P_q^{jam} > \chi_q$ then $\lambda_q^1 < \lambda_q^2$. Therefore, the tuple $(\chi_1,\chi_2)$ or $(P_1^{jam}, P_2^{jam})$ happen when $\lambda_q > \lambda_q^1$, $\forall q$ or $\lambda_q < \lambda_q^2, \forall q$, respectively. It was assumed w.l.o.g. that $$\chi_q < \frac{P_q - p_q}{N_{T_q} - 1}$$

because if $$\chi_q \leq \frac{P_q - p_q}{N_{T_q} - 1}$$

the forms of NE tuples overlap with each other (note that the effect of $\lambda_q$ is negligible on the convergence behavior of (23a) because $\lambda_q$ is a sublinear function of jamming powers.

Robust Optimization Procedure

So far, we proved that price-based jamming control results in locally optimum jamming powers. The next challenging question is how to determine the best price without having exact knowledge of the eavesdropping channel.

When exact knowledge of the eavesdropping channel is available, iterative computation of $\sigma^*_q$ in (23a) can lead to the NE. Also, the price that results in locally optimal jamming powers of the secrecy sum-rate can be computed using (22a). However, the unknown eavesdropping channel imposes uncertainties in computing $\sigma^*_q$ and $\lambda_q$. In the following, we propose a method to overcome the issue of uncertainty in the eavesdropping channel.

Let $R_q(s_1 s_2)$ be the utility of the qth user where $s_1$ and $s_2$ represents the strategy taken by user1 and user2, respectively. The strategy space of each user is a continuous interval that can be written as $\sigma_q \in [\Delta\sigma_q, P_q^{jam}]$. The strategy set of the players has infinite real numbers. If we are to analyze this game using strategy tables, then the strategy set of each player should be countable and finite. In order to create a finite strategy set, we introduce discrete levels of the jamming power. Assuming that we have n bits to convey M power levels, the power level increment is $$\Delta\sigma_q = \frac{P_q^{jam}}{M} = \frac{P_q^{jam}}{2^n}.$$

The discrete power level is small enough that it constrains the continuous set of utility values to a relatively small discrete set with minimal quantization error. Hence, the strategy set would be $S_q = \{\Delta\sigma_q, 2\Delta\sigma_q, \ldots, (M-1)\Delta\sigma_q, P^{jam}\}$, $\forall q$. Considering that $s_q \in S_q, \forall q$, a utility matrix $R_q$, q=1,2 can be obtained such that its (i,j) entry is $[R_q]_{ij} = \{R_q(i\Delta\sigma_q, j\Delta\sigma_q) | (i,j) \in \{1, \ldots, M\}^2\}$.

Since the problem in (13a) is non-convex w.r.t the jamming power, Pareto-optimal points can be found via exhaustive search in Table I. Considering a finite jamming game, the complexity of this optimization is in the order of $\mathcal{O}(n^2)$. Proposition 2 reduces the complexity order to $\mathcal{O}(4n-4)$ because only a small set of jamming power tuples comprise the NE points of price-based friendly jamming, meaning that the locally optimal points of the secrecy sum-rate can be found by searching a small portion of Table I. To get more intuition into the order reduction, we mention a special case of proposition 2. If (18a) is always satisfied for both users, then only the rows corresponding to $\Delta\sigma_1$ and $P_1^{jam}$, and the columns corresponding to $\Delta\sigma_2$ and $P_2^{jam}$ need to be searched. In the following, we introduce the concept of mixed strategic games.

Table I: Strategy table for the two user finite jamming game with pricing.

| $s_1 \backslash s_2$ | $\Delta\sigma_2$ | $2\Delta\sigma_2$ | ... | $P_2^{jam}$ |
|---|---|---|---|---|
| $\Delta\sigma_1$ | $R_1(\Delta\sigma_1, \Delta\sigma_2)$, $R_2(\Delta\sigma_1, \Delta\sigma_2)$ | $R_1(\Delta\sigma_1, 2\Delta\sigma_2)$, $R_2(\Delta\sigma_1, 2\Delta\sigma_2)$ | ... | $R_1(\Delta\sigma_1, P_2^{jam})$, $R_2(\Delta\sigma_1, P_2^{jam})$ |
| $2\Delta\sigma_1$ | $R_1(2\Delta\sigma_1, \Delta\sigma_2)$, $R_2(2\Delta\sigma_1, \Delta\sigma_2)$ | $R_1(2\Delta\sigma_1, 2\Delta\sigma_2)$, $R_2(2\Delta\sigma_1, 2\Delta\sigma_2)$ | ... | $R_1(2\Delta\sigma_1, P_2^{jam})$, $R_2(2\Delta\sigma_1, P_2^{jam})$ |
| ... | ... | ... | ... | ... |
| $P_1^{jam}$ | $R_1(P_1^{jam}, \Delta\sigma_2)$, $R_2(P_1^{jam}, \Delta\sigma_2)$ | $R_1(P_1^{jam}, 2\Delta\sigma_2)$, $R_2(P_1^{jam}, 2\Delta\sigma_2)$ | ... | $R_1(P_1^{jam}, P_2^{jam})$, $R_2(P_1^{jam}, P_2^{jam})$ |

Definition 1.

A mixed strategy vector for the qth user $\mathcal{A}_q = \{[\alpha_i^q]_{i=1}^M | 0 \leq \alpha_i^q \leq 1, i\alpha iq=1, \forall q\}$ denotes a probability distribution of the strategy set's elements. That is to say the qth player chooses the power level $i\Delta\sigma_q$ with probability $\alpha_i^q$.

In the mixed strategic jamming game, both users choose their jamming power level based on a probability distribution. Hence, the best response of each user is to maximize the expected value of its own utility. We should note that some games can be limited to only pure strategies. In particular, if the utility function of a player is concave w.r.t. its strategy then using Jensen's inequality, we deduce that $$E_{s_1}[E_{s_2}[R_1(s_1,s_2)]] \leq E_{s_2}[R_1(E_{s_1}[s_1],s_2)],$$

$$\forall (s_1,s_2) \in S_1 \times S_2, \qquad (25a)$$

The inequality in (25a) is satisfied with equality if and only if $s_1$ reduces to pure strategies. Hence, whatever the strategies of other players are, every NE of the game is achieved using pure strategies [18a]. Sufficiency of pure strategies cannot be guaranteed if the utility function of a player is not concave w.r.t. its action. Hence, mixed strategies should also be investigated for non-concave utilities.

In price-based friendly jamming, the utility function to each player changes at every iteration. Furthermore, the strategy table looks at the outcome of the game when iterative usage of (23a) has converged. Hence, it is not possible to use the objective function in (21a) as the utility functions in the strategy table. In order to establish the strategy table, we look at (19a) again. As theorem 1 suggests that the K.K.T. conditions of (19a) are met at the NE point, the utility of each user at the NE point is $R_q(s_1,s_2) = C^{sec}(\sigma_q)$, $\forall q \in \{1,2\}$ which is a non-concave function w.r.t. $\sigma_q$. By setting $C^{sec}$ as a function of $\sigma_q$, we want to emphasize that each user locally computes its own jamming power and checks its effect on secrecy sum-rate. Recalling proposition 2, at a locally optimal point, only one tuple of jamming power at the corner entries of Table I happen. Hence, the objective of 1st user is, $$\text{maximize}_{\alpha^1} \sum_{i=1}^{M} \alpha_i^1 R_1(i\Delta\sigma_1, s_2), \qquad (26a)$$

$$\text{s.t.} \sum_{i=1}^{M} \alpha_i^1 = 1,$$

$$0 < \alpha_i^1 < 1, \forall i,$$

$$s_2 \in \left\{\lceil \frac{\chi_2}{M} \rceil \Delta\sigma_2, P_2^{jam}\right\}$$

where $\alpha^q=[\alpha_1^1, \ldots, \alpha_M^1]^T$ is the probability set, and [ . . . ] rounds to positive infinity. Problem (26a) is a linear programming which can be solved efficiently using Simplex method. The 2nd user's strategy can be found accordingly.

So far, all of the derivations were based on complete knowledge of the eavesdropping channel. However, the existence of a passive Eve in the network contradicts with our assumption. For the qth user, the computation of the secrecy rate defined in (8a) depends on knowing $C_q$ and $C_{eq}$. Since we assumed that Bob can measure his received interference and Alice is aware of the channel between her and her corresponding Bob, the computation of $C_q$ can be done locally. However, the eavesdropping channel is unknown. The eavesdropping channel components can be equivalently shown as the product of some large-scale and small-scale fading, so $G_q = \overline{G}_q(d_q^{-\eta})$ and $G_{j_q} = \overline{G}_{j_q} (d_{j_q}^{-\eta})$, where $\overline{G}_q$ and $\overline{G}_{j_q}$ are scalar and $1 \times (N_{T_q}-1)$ matrix, respectively, and the entries of both are i.i.d. standard complex Gaussian random variables with unit variance (The same representation can be done for $H_{qr}$ and $H_{j_q}$). The terms $d_q^{-\eta}$ and $d_{j_q}^{-\eta}$ are the equivalent distances where $d_q^{-\eta}$ is a scalar and $d_{j_q}^{-\eta}$ is a diagonal $(N_{T_q}-1) \times (N_{T_q}-1)$ matrix, and $\eta$ is the equivalent path-loss exponent. The secrecy rate in such settings is, $$C_q^{sec} = C_q - \underset{\begin{bmatrix} d_q \overline{G}_q \\ d_r \overline{G}_r \\ \overline{G}_{j_r} \end{bmatrix}}{E}[C_{eq}] = C_q - \quad (27a)$$

$$E\left[\log\left(1 + \frac{|G_q|^2 \gamma_q}{|G_{j_q}|^2 \sigma_q + |G_r|^2 \gamma_r + |G_{j_r}|^2 \sigma_r + N_0}\right)\right]. \quad (28a)$$

We derive (28a) as $$\underset{\begin{bmatrix} d_q \overline{G}_q \\ d_r \overline{G}_r \\ \overline{G}_{j_r} \end{bmatrix}}{E}[C_{eq}] = \underset{\begin{bmatrix} d_q W_q \\ d_r Y_q \end{bmatrix}}{E}\left[\log\left|\frac{W_q \Gamma_{1q} W_q^H}{Y_q \Gamma_{2q} Y_q^H}\right|\right] \quad (29a)$$

where $W_q = [\overline{G}_q, \overline{G}_{j_q}, \overline{G}_r, \overline{G}_{j_r}, e_q]$, and $Y_q = [\overline{G}_{j_q}, \overline{G}_r, \overline{G}_{j_r}, e_q]$. Let the expression diag$\{E,F\}$ represent a 2×2 diagonal matrix whose diagonal entries are E and F. Then, $$\Gamma_{1q} = \text{diag}\left\{\gamma_q, \sigma_q[\underbrace{1, \ldots, 1}_{N_{T_q}-1}]\left(\frac{d_{j_q}}{d_q}\right)^{-2\eta}, \right. \quad (30a)$$

$$\left. \left(\frac{d_r}{d_q}\right)^{-2\eta}\gamma_r, \sigma_r[\underbrace{1, \ldots, 1}_{N_{T_r}-1}]\left(\frac{d_{j_r}}{d_q}\right)^{-2\eta}, (d_q)^{2\eta}N_0\right\},$$

$$\Gamma_{2q} = \text{diag} \quad (31a)$$

$$\left\{\sigma_q[\underbrace{1, \ldots, 1}_{N_{T_q}-1}]\left(\frac{d_{j_q}}{d_r}\right)^{(-2\eta)}, \gamma_r, \sigma_r[\underbrace{1, \ldots, 1}_{N_{T_r}-1}]\left(\frac{d_{j_r}}{d_r}\right)^{-2\eta}, (d_r)^{2\eta}N_0\right\}.$$

The expectation in (29a) w.r.t. Wq and Yq can be efficiently computed using the random matrix result in [21a, Appendix A, Lemma 2]. However, $C_{eq}$ is still an expectation over the distances $d_q$ and $d_r$, which corresponds to geometry distribution of Eve. Since we were not able to analytically formulate this distribution, we numerically sample these parameters to approximate the expectation of $C_{eq}$ w.r.t. the distances. In simulations, we assumed that Eve is uniformly distributed within a circle with a given radius, and the center of this circle is determined depending on our simulation scenario. Similar idea can be found in [17a] where the authors assume that Eve is uniformly distributed around the transmitter. Another example is [22a] where the authors assumed that the location of Eve follows a Poisson process. With the same technique used in (29a), the expectation on the right hand side of equation (14a) that yields positive secrecy is as follows:

$$\sigma_q > \frac{(|H_{rq}|^2 \gamma_r + |H_{j_r}|^2 \sigma_r + N_0)}{|H_{qq}|^2} \underset{\begin{bmatrix} \overline{G}_q \\ \overline{G}_{j_q} \end{bmatrix}}{E}\left[\frac{|G_q|^2}{|G_{j_q}|^2}\right] - \quad (32a)$$

$$\underset{\begin{bmatrix} \overline{G}_r d_q d_r \\ \overline{G}_{j_r} \overline{G}_{j_q} \end{bmatrix}}{E}\left[\frac{(|G_r|^2 \gamma_r + |G_{j_r}|^2 \sigma_r + N_0)}{|G_{j_q}|^2}\right].$$

The numerator and the denominator inside the first expectation term in (32a) correspond to a central Wishart matrix. The numerator inside the second expectation term corresponds to the quadratic form of a Wishart matrix, which preserves Wishartness property [23a]. Hence, both of the expectations correspond to the ratio of two Wishart matrices. Since we assumed a MISO system, all of the Wishart matrices are in fact scalars. Hence, the expectations in (32) can be computed using the result in [24a, section 1]. Computing the expectation w.r.t. $d_q$ and $d_r$ can be tackled the same as what we will do for computation of $C_{eq}$ (i.e., equation (29a)) in simulations. Since (27a) and (32a) are computable, then the objective function and third constraint of (26a) are defined without the knowledge of the eavesdropping channel. Hence, we can establish Table I to solve (26a). The following describes an algorithm that achieves a robust solution for (26a).

Algorithm Design

The pseudo code of our algorithm that achieves a robust solution for the jamming control is shown below. In order to approximate the expectation of $C_{eq}$ w.r.t. the distances, the location of Eve will be assigned as a uniform distribution within a circle with radius $\hat{r}_e$ and the center coordinates of $(\hat{x}_e, \hat{y}_e)$. Computation of line 5 and line 6 can be done using the method mentioned in (32a) (only for when $\sigma_r = \chi_r$ which requires both users to measure the interference at their receivers and exchange the values of $\sigma_q$ and $\gamma_q$ for q=1, 2. Note that the result of proposition 2 suggests that the computation of line 5 only sets two power levels for $\sigma_r$ (i.e., the loop in line 3 will be run once when $\sigma_r = \chi_r$ and once when $\sigma_r = P_r^{jam}$) For the case of exhaustive search, instead of two power levels, we should search in all of the power levels in the interval $[\chi_r, P_r^{jam}]$.

Line 7 ensures that the selected power in line 4 results in a non-zero utility for the qth user. If the condition on line 7 is not satisfied the probability assigned to that power level (i.e., $\alpha_i^q$) is zero. Hence, one term will be removed from the objective and constraints of (26a). The operation in line 8 (computed in (27a)) firstly requires both users to compute their own secrecy rate using their local channel and the method mentioned for (27a). Then, the rth user should send the value of its own secrecy rate to the qth user in order to compute $R_q$. After doing the operations of lines 2-12, two probability sets (i.e., two different vectors corresponding to $\alpha^q$) will be found for the qth user (one for when $\sigma_r = \chi_r$ and one for when $\sigma_r = P_r^{jam}$). As $R_q$ is already stored in line 8, line 14 chooses the probability set corresponding to the largest expected utility. Assuming that Alice is capable of generating random samples of a continuous-time uniform distribution, creating a probabilistic jamming power assignment is done by converting the uniform distribution to a probability mass function corresponding to $\alpha^q$ for q=1; 2 [25a]. Comparing to the pricing with complete knowledge of the eavesdropping channel, the robust jamming control only needs exchanging secrecy rates and jamming powers.

The lines 16 to 25 constitute the outer loop of the algorithm that corresponds to satisfying rate constraints of the users. For some choice of $\delta$ and $\epsilon$, since the information rate is a nonnegative monotonically increasing function of $\gamma_q$ and the fact that $p_q$ is a finite value, as long as the rate requirements are feasible, the linear (margin-adaptive) adjustment used in algorithm 1 converges without the need for central control (similar procedure can be found in [26a, Algorithm 1]). Hence, this linear adjustment ensures each user achieves its minimum target rate. If the target rate is not achievable, then the line 18 limits the users to their maximum information signal's power.

Algorithm 1. Robust Jamming Control

---

Input: $\begin{cases} N_{T_q}, P_q, \phi_q = \dfrac{p_q}{\sigma_q(N_{T_q} - 1)}, c_q, M \quad \forall q \in \{1, 2\} \\ \hat{r}_e \quad \%\text{ The radius of the circle within which} \\ \qquad \%\text{ Eve is uniformly distributed} \\ (\hat{x}_e, \hat{y}_e) \quad \%\text{ The center of the circle within which} \\ \qquad \%\text{ Eve is uniformly distributed} \end{cases}$ Initialize $0 < \gamma_q < p_q, \Delta\sigma_q = \dfrac{p_q^{jam}}{M} \quad \forall q$ 1: repeat
2:　for q = 1 to 2 do
3:　　for i = 1 to M do
4:　　　Set $\sigma_q = i\Delta\sigma_q$.
5:　　　Compute $\sigma_r = \chi_r$, r ≠ q.
6:　　　Compute $\chi_q$.
7:　　　if $\sigma_q < \chi_q$ then Set $\alpha_q^i = 0$.
8:　　　else Compute and store $R_q$.
9:　　　end if
10:　　end for % do the same loop again by change
11:　　　　% line 5 to "Set $\sigma_r = P_r^{jam}$".
12:　　Find $\alpha_q$ by solving (26), % once for $\sigma_r = \chi_r$ and
13:　　　　　　　　　　% once for $\sigma_r = P_r^{jam}$.
14:　　Choose the probability set (i.e., $\alpha_q$) that corresponds to the largest expected utility.
15:　end for
16:　for q = 1 to 2 do
17:　　if $C_q < c_q$ then Set $\gamma_q = \gamma_q + \delta$.
18:　　if $\gamma_q > p_q$ then Set $\gamma_q = p_q$.
19:　　end if
20:　　else
21:　　　if $\gamma_q > c_q + \epsilon$ then Set $\gamma_q = \gamma_q - \delta$.
22:　　　end if
23:　　end if
24:　end for
25: until $C_q > c_q \, \forall q$.

---

Numerical Results

In this part, we simulate the methods mentioned so far. In all of the simulations, the variance of additive noise at both receivers and at Eve (i.e., noise floor) is set to be $N_0 = -50$ dBm. Also, the information rate constraints are chosen such that the users use the maximum information signal's power. The horizontal axis in all of the figures is the horizontal coordinate for the center of the circle within which Eve is uniformly distributed. Each point on the curves is the result of averaging over 10 random locations of Eve (in order to approximate (27a) w.r.t. distances). At each random location of Eve, 500 channel realizations are simulated and then averaged.

Figure 3:
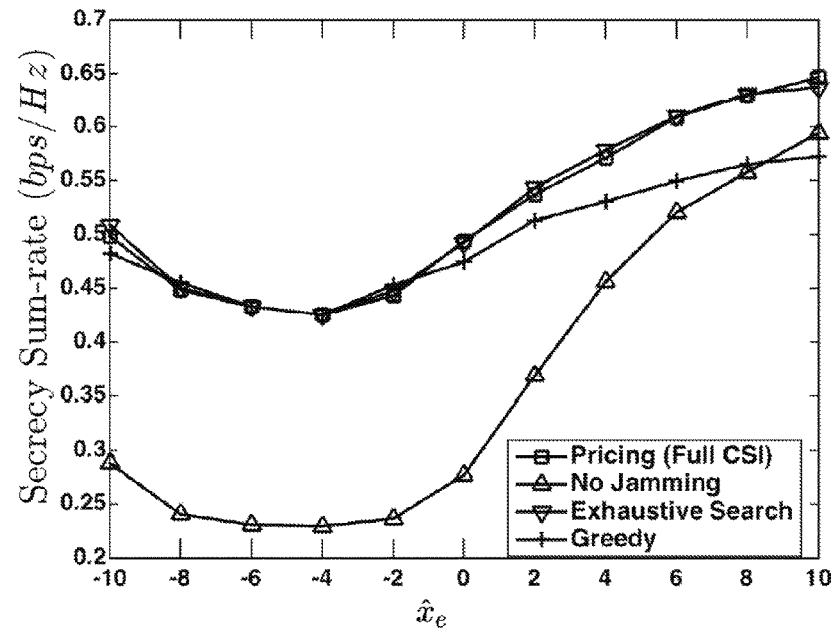
FIG. 3 depicts an exemplary effect of Eve's location on secrecy sum-rate, wherein the configuration is $$\left\{ \text{Alice}_1 = (-5, 8), \text{Bob}_1 = (5, 8), \right.$$
$$\text{Alice}_2 = (-5, -8), \text{Bob}_2 = (5, -8),$$
$$\left. \hat{y}_e = 3.5, \hat{r}_e = 1.6, P_q = -32 \text{ dBm}, \phi_q = \frac{1}{3}, N_{T_q} = 3 \right\}.$$

FIG. 3 shows the variation of secrecy sum-rate in terms of Eve's location for a given total power constraint. It can be seen that greedy friendly jamming is outperforming no-jamming for all of Eve's locations. This due to the fact that in no-jamming scenario, Eve can decode both of the signals using SIC technique, which reduces the secrecy rates. Furthermore, when $x_e \in [-8, -2]$, the performance of price-based friendly jamming is equal to the performance of greedy friendly jamming and that of exhaustive search, which indicates the optimality of greedy friendly jamming in these areas. It can also be seen that in all of Eve's locations, the pricing scheme has a performance close to the exhaustive search approach. As far as what we simulated, the optimality of greedy friendly jamming can be guaranteed only for very low power constraints that are not practical.

Figure 4:
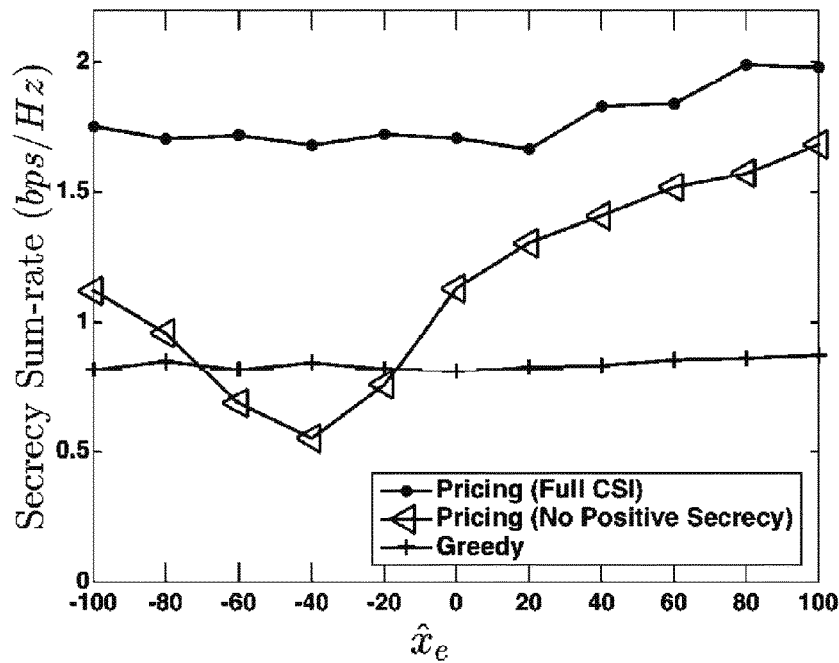
FIG. 4 depicts an exemplary effect of Eve's location on secrecy sum-rate, wherein the configuration is $$\left\{ \text{Alice}_1 = (-50, 10), \text{Bob}_1 = (5, 10), \right.$$
$$\text{Alice}_2 = (-50, -10), \text{Bob}_2 = (50, 10),$$
$$\left. \hat{y}_e = 0, \hat{r}_e = 10, P_q = 0 \text{ dBm}, \phi_q = \frac{1}{3}, N_{T_q} = 3 \right\}.$$
Figure 7:
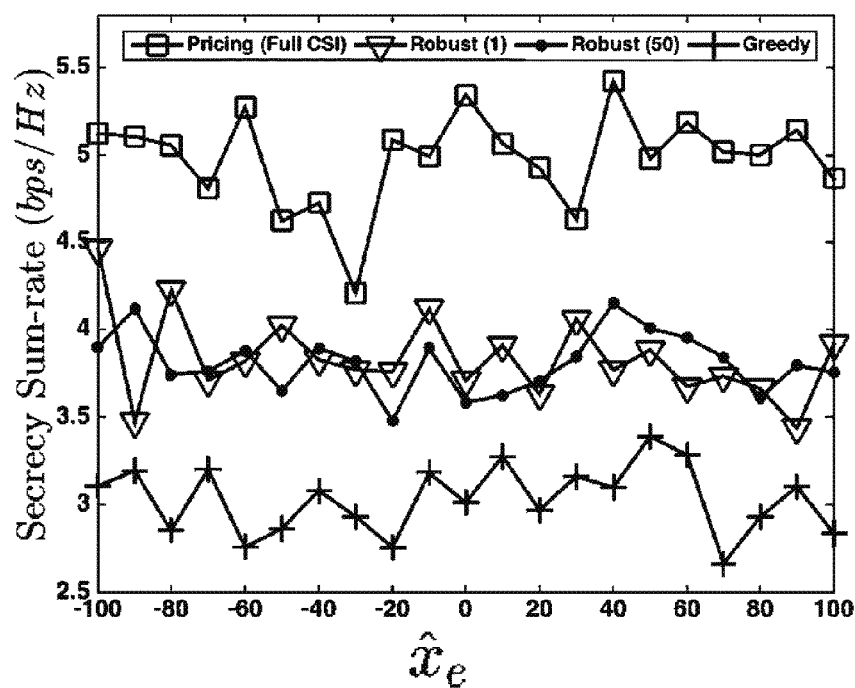
FIG. 7 depicts an exemplary effect of small number of sample data transmissions, wherein the configuration is $\{(\varphi_q=\frac{1}{3}, \text{Alice}_1=(-20,20), \text{Bob}_1=(20,20), \text{Alice}_2=(-20,-20), \text{Bob}_2=(20,-20), \hat{y}_e=10, \hat{r}_e=20, P_q=10 \text{ dBm}, N_{T_q}=4 \forall q\}$.

FIG. 4 and FIG. 5 show the secrecy rates of the users for another configuration. In this configuration, we simulated the pricing method for when we take the constraint (14a) into account (indicated as "Pricing (Full CSI)") and for when we do not (indicated as "Pricing (No Positive Secrecy)"). It can be seen that considering (14a) in our jamming control significantly affects the secrecy sum-rate such that if it is overlooked, the performance of pricing method would be even lower than greedy approach in some points. Furthermore, satisfying the condition in (14a) guarantees non-zero secrecy rate for each user. However, if it is ignored, zero secrecy-rate happens to one or both users at some locations.

In FIG. 6, we compared the performance of Algorithm 1 (indicated as "Robust") to other approaches. The geometry distribution for Eve is the same as previous simulations, but $P_q = 10$ dBm. For the case of robust jamming control, we assumed that we use 8 bits for quantization of power levels. After finding the probability set that maximizes the expected utility in (26a), the probabilistic assignment of jamming power in robust jamming control is as follows. The qth user generates a sample of a continuous-time uniformly distributed random variable with zero mean and unit variance. These samples are then converted to some probability mass $\alpha_i^q$. Then, the probability mass is translated to $i\Delta\sigma_q$ and the user starts data transmission with that jamming power. Lastly, the achievable rate is computed using the method in (27a). This procedure is repeated 50 times per each channel realization and the expected utility in (26a) is approximated by averaging over these 50 samples of data transmission. It can be seen that the robust approach is 25 percent better than the greedy approach. When the eavesdropping channel is known, the advantage of price-based jamming becomes larger.

The expected value in (26a) must be computed after averaging over several samples of data transmissions within one channel realization. However, in practical scenarios, the coherence time is not long enough to accommodate more than a very small number of data transmissions. In order to test this vulnerability, we compared the performance of robust optimization between 50 data transmissions and 1 data transmission per each channel realization so as to compute the expected utility in (26a). Furthermore, in order to fix the other parameters that might affect this comparison, we simulated 50 channel realizations at each location of Eve. It can be seen in FIG. 7 that averaging over 1 data transmission (indicated as "Robust(1)") does not affect the secrecy sum-rate very much comparing to averaging over 50 data transmissions (indicated as "Robust(50)"). Therefore, the robust jamming control can also be implemented in channels with low coherence times.

In this embodiment, the present invention showed that the greedy friendly jamming is not an optimal approach to realize a secure network. This embodiment of the present invention features a price-based jamming control that guarantees a local optimum for secrecy sum-rate. Simulations demonstrated a noticeable improvement in secrecy sum-rate by using pricing in jamming control. Uncertainty was then introduced in the eavesdropping channel and a robust method was designed. The robust jamming control can be used when the eavesdropper cannot be monitored in the network.

Example 2

The following is a non-limiting example of a scenario where a transmitter sends two independent confidential data streams, intended to two legitimate users, in the presence of an eavesdropper at an unknown location.

System Model

As shown in FIG. 8, we consider a two-user broadcast channel in which Alice transmits two independent confidential data streams to Bob and Charlie in the presence of Eve. Let the number of antennas at Alice and Eve be $N_A$ and $N_E$, respectively. The intended receivers, Bob and Charlie, have FD radios, each with a single antenna [16b]. Let $x_A \in \mathcal{C}^{N_A \times 1}$ be Alice's transmit signal, which includes two information messages plus TxFJ. Let $x_B$ and $x_C$ denote the transmit RxFJ signals from Bob and Charlie, respectively. The signals received by Bob, Charlie, and Eve are, respectively, given by:

$$y_B = h_{AB}x_A + h_{BB}x_B + h_{CB}x_C + n_B \tag{1b}$$

$$y_C = h_{AC}x_A + h_{BC}x_B + h_{CC}x_C + n_C \tag{2b}$$

$$y_E = H_{AE}x_A + h_{BE}x_B + h_{CE}x_C + n_E \tag{3b}$$

where $h_{AB} \in \mathcal{C}^{1 \times N_A}$, $h_{AC} \in \mathcal{C}^{1 \times N_A}$, $h_{BE} \in \mathcal{C}^{N_E \times 1}$, and $h_{CE} \in \mathcal{C}^{N_E \times 1}$ are the channel vectors between Alice and Bob, Alice and Charlie, Bob and Eve, and Charlie and Eve, respectively. $h_{BB}$ and $h_{CC}$ are the self-interference channel gains, whereas $h_{CB}$ and $h_{BC}$ are the channel gains between Charlie and Bob, and between Bob and Charlie, respectively. $H_{AE} \in \mathcal{C}^{N_E \times N_A}$ is the channel matrix between Alice and Eve. $n_B \sim \mathcal{CN}(0, \sigma_B^2)$, $n_C \sim \mathcal{CN}(0, \sigma_C^2)$, and $n_E \sim \mathcal{CN}(0, I_{N_E}\sigma_E^2)$ represent AWGN at Bob, Charlie and Eve, respectively. We assume block fading (the indices representing fading blocks and time instants are suppressed to improve readability). Furthermore, we assume that Eve's CSI is not known to Alice, Bob, or Charlie. However, Eve may know her own channels and other channels by overhearing exchanged control packets between Alice and Bob/Charlie. We impose the following instantaneous power constraints:

$$\mathbb{E}[x_A^\dagger x_A] \leq P_A \tag{4b}$$

$$\mathbb{E}[|x_i|^2] \leq P_i, \ i \in \{B, C\} \tag{5b}$$

where $P_A$, $P_B$, and $P_C$ are given constant's.

Rx-Based FJ with Zero-Forcing

A. Communication Scheme

The transmit signal at Alice can be expressed as:

$$x_A = v_B s_B + v_C s_C + z_A w_A \tag{6b}$$

where $s_B \sim \mathcal{CN}(0, \sigma_{s_B}^2)$ and $s_C \sim \mathcal{CN}(0, \sigma_{s_C}^2)$ are the information signals, $v_B \in \mathcal{C}^{N_A \times 1}$ and $v_C \in \mathcal{C}^{N_A \times 1}$ are normalized precoding vectors for Bob and Charlie, respectively, such that $v_B^\dagger v_B = 1$ and $v_C^\dagger v_C = 1$, $w_A \sim \mathcal{CN}(0, \sigma_{J_A}^2)$ is the TxFJ signal, and $z_A \in \mathcal{C}^{N_A \times 1}$ is its precoding vector. We let $z_A^\dagger z_A = 1$. (Note that we assume $N_A = 3$. However, this scheme can be easily extended to a scenario where $N_A > 3$. In that case, $N_A - 2$ independent TxFJ signals, $w_A^{(1)}, \ldots, w_A^{(N_A-2)}$, are generated at Alice, and $z_A w_A$ is replaced by $\Sigma_{(k=1)}^{(N_A-2)} z_A^{(k)} w_A^{(k)}$.) Moreover, the RxFJ signals transmitted by Bob and Charlie are given by $x_i = w_i$, $i \in \{B, C\}$, where $w_i \sim \mathcal{CN}(0, \sigma_{J_i}^2)$. Given the above, the received signals at Eve, Bob, and Charlie reduce to:

$$y_E = H_{AE}v_B s_B + H_{AE}v_C s_C + H_{AE}z_A w_A + h_{BE}w_B + h_{CE}w_C + n_E \tag{7b}$$

$$y_i = h_{Ai}v_i s_i + h_{Ai}v_j s_j + h_{Ai}z_A w_A + h_{ii}w_i + h_{ji}w_j + n_i \tag{8b}$$

where in (8b) $\{i, j\} \in \{B, C\}$ and $i \neq j$.

To increase the communication rates, we consider zero-forcing precoding for the information signal intended to Bob such that it is cancelled out at Charlie, and vice versa. (This technique also provides confidentiality for Bob's message at Charlie and vice versa.) Accordingly, we consider the following zero-forcing constraints.

$$h_{AB}v_C = 0 \tag{9b}$$

$$h_{AC}v_B = 0. \tag{10b}$$

We note that $h_{AB}$ and $h_{AC}$ should be linearly independent (otherwise, the cancellation will occur at the intended receivers as well), and the independence occurs with probability 1 due to fading. Constraint in (9b) (also, (10b)) reduces the degrees of freedom for the selection of the precoder $v_C$ ($V_B$) by one, leaving $N_A - 1$ degrees of freedom. As will be described herein, we discuss how to uniquely determine the "optimal" $v_C$ ($V_B$) that maximizes the information rate at Charlie (Bob).

The TxFJ signal coming from Alice to Bob is designed to be orthogonal to the channel between them in order to improve SINR level at Bob. A similar constraint is also imposed on the TxFJ signal observed by Charlie. In other words, we require $$h_{AB}z_A = 0 \tag{11b}$$

$$h_{AC}z_A = 0. \tag{12b}$$

It follows that $z_A \in [\text{span}(h_{AB}, h_{AC})]^\perp$.

We consider full-duplex radio design as introduced in [16b] to eliminate the self-interference arising from the transmission of RxFJ signal $W_B$ at Bob ($w_C$ at Charlie, respectively). In particular, we incorporate into the model a residual self-interference term using SIS ratio, defined as the portion of self-interference left after suppression. This residual term is denoted with the scale factor $\alpha \in [0, 1]$. Accordingly, (8b) becomes:

$$y_i = h_{Ai}v_i s_i + \alpha h_{ii}w_i + h_{ji}w_j + n_i. \tag{13b}$$

With this communication scheme, by controlling the RxFJ powers at Bob and Charlie, we can manage the interference they impose on each other.

B. Achievable Secrecy Sum-Rate

Let $\mathfrak{I}(X; Y)$ refer to the mutual information between any two signals X and Y. We let $s_B \in S_B$, $S_C \in S_C$, $y_B \in Y_B$, $y_C \in Y_C$, and $y_E \in Y_E$. Given the communication scheme described in the previous section, the Alice→Bob and Alice→Charlie links can support the following instantaneous mutual information expressions:

$$R_B \stackrel{def}{=} I(S_B; Y_B) = \log(1 + SINR_B) \quad (14b)$$

$$R_C \stackrel{def}{=} I(S_C; Y_C) = \log(1 + SINR_C) \quad (15b)$$

where $i \in \{B, C\}$, $$SINR_i = \frac{\sigma_{S_i}^2 |h_{Ai} v_i|^2}{\alpha |h_{ii}|^2 \sigma_{J_i}^2 + |h_{ji}|^2 \sigma_{J_j}^2 + \sigma_i^2}.$$

Remark 1:

Later on, we incorporate the constraint $SINR_i \geq T$, where T is a required minimum SINR level at Bob/Charlie. In that case, we assume $R_i = \log(1+T)$, if $SINR_i \geq T$, and zero otherwise, for $i \in \{B, C\}$.

The received signal at Eve becomes:

$$y_E = H_{AE} v_B s_B + H_{AE} v_C s_C + n \quad (16b)$$

where $$n \stackrel{def}{=} H_{AE} z_A w_A + h_{BE} w_B + h_{CE} w_C + n_E.$$

Regarding this signal, we utilize the following mutual information expressions:

$$R_{E,B} \stackrel{def}{=} I(S_B; Y_E) \quad (17b)$$
$$= \log\left(1 + \sigma_{S_B}^2 h_{AE_B}^\dagger \left(\sigma_{S_C}^2 h_{AE_C} h_{AE_C}^\dagger + K\right)^\dagger h_{AE_C} + K\right)^{-1} h_{AE_B}\right)$$

$$R_{E,C} \stackrel{def}{=} I(S_C; Y_E | S_B) \quad (18b)$$
$$= \log\left(1 + \sigma_{S_C}^2 h_{AE_C}^\dagger K^{-1} h_{AE_C}\right)$$

Where $$h_{AE_B} \stackrel{def}{=} H_{AE} v_B,$$
$$h_{AE_C} \stackrel{def}{=} H_{AE} v_C \text{ and } K \stackrel{def}{=} \sigma_{J_A}^2 H_{AE} z_A z_A^\dagger H_{AE}^\dagger + \sigma_{J_B}^2 h_{BE} h_{BE}^\dagger + \sigma_{J_C}^2 h_{CE} h_{CE}^\dagger + \sigma_E^2 I_{N_E}, \{i,j\} \in \{B, C\} \text{ and } i \neq j.$$

These expressions correspond to employing an MMSE-SIC decoder at Eve (a sum-rate optimal receiver strategy), and are utilized in the proof of secrecy. In particular, secrecy precoding for the signals intended to Bob and Charlie are designed according to the leakage seen by the eavesdropper over the fading channels, i.e., the required amount of randomization. The following theorem provides the resulting sum-rate.

Theorem 2:

An achievable secrecy sum-rate is given by $$R_{sum} = \mathbb{E}\left[[R_B - R_{E,B}]^+ + [R_C - R_{E,C}]^+\right] \quad (19b)$$

where the expectation is defined over different fading blocks.

We note the followings:

In the proposed coding scheme, the achievable secrecy rates at Bob and Charlie are given by $$R_B^{(s)} \stackrel{def}{=} \mathbb{E}\left[[R_B - R_{E,B}]^+\right] \text{ and } R_C^{(s)} \stackrel{def}{=} \mathbb{E}\left[[R_C - R_{E,C}]^+\right]$$

respectively. As the sum-rate is considered, the asymmetric nature of secrecy rate penalties ($\mathbb{E}[R_B] - R_B^{(s)}$ vs. $\mathbb{E}[R_C] - R_C^{(s)}$) is immaterial. If equal rates are desired, for instance due to fairness constraints, a time-division scheme can be implemented. That is, for half of the fading blocks, the scheme above can be used; for the remaining blocks, one can use the same scheme but with $R_{E,B} = I(S_B; Y_E | S_C)$ and $R_{E,C} = I(S_C; Y_E)$. This way, each user would achieve a secrecy rate given by $R_{sum}/2$.

Information leakage is bounded by the designed rate of the signal. For instance, for fading blocks where Eve's information rate on Bob's signal ($R_{E,B}$) is higher than the signal rate $R_B$, there is no extra leakage (additional rate penalty) on the rate of the intended message. On the other hand, for the remaining fading blocks, where $R_B > R_{E,B}$, the coding scheme capitalizes upon the inferior signal quality at the eavesdropper. This mechanism occurs on the fly, i.e., without knowledge of Eve's CSI at Alice.

If the network includes multiple eavesdroppers (say, with different channel fading distributions), the achieved sum rate can be modified as:

$$R_{sum} = \min_{E \in \varepsilon} \{\mathbb{E}\left[[R_B - R_{E,B}]^+ + [R_C - R_{E,C}]^+\right]\}$$

where $\varepsilon$ denotes the set of eavesdroppers. Later on, we consider different channel models (protocol vs. path loss models), and we report the worst-case achieved secrecy rates (best possible eavesdropping).

C. Optimization Formulation

Given the achievable secrecy rate defined in Theorem 2, our objective in this section is to maximize this rate by optimizing the power allocation to data and jamming signals, and designing the best possible beamforming vectors. The corresponding optimization formulation is given by:

$$\underset{\{\sigma_{S_B}^2 + \sigma_{S_C}^2 + \sigma_{J_A}^2 \leq P_A, \sigma_{J_B}^2 \leq P_B, \sigma_{J_C}^2 \leq P_C\}}{\text{maximize}} R_{sum} \quad (20b)$$

and subject to constraints (9b), (10b), (11b), (12b), and $v_B^\dagger v_B = v_C^\dagger v_C = z_A^\dagger z_A = 1$.

At this point, we consider a practical assumption, which enables us to solve the above optimization problem. We assume that the SINR at Bob/Charlie must be greater than or equal to T, otherwise $R_B$ and $R_C$ will be equal to zero. As a result, we should allocate just enough power for the information signals to satisfy this SINR threshold. The rest of the power budget at Alice can be used for TxFJ in order to decrease the SINR level at Eve as much as possible. Therefore, we set $SINR_i = T$ for $i \in \{B, C\}$.

We note that there is more than one possible linear precoding vectors that satisfy the constraint $h_{Ai} v_j = 0$, for $\{i, j\} \in \{B, C\}$ and $i \neq j$. In this case, $v_j$ should be chosen such that $|h_{Aj} v_j|$ takes its maximum value. With this maximization (and the norm constraints on the beamforming vectors), we can write $\sigma_{J_B}^2$ and $\sigma_{J_C}^2$ as functions of $\sigma_{S_B}^2$ and $\sigma_{S_C}^2$ for a given T and $\alpha$. Then, $\sigma_{J_A}^2$ is given by:

$$\sigma_{J_A}^2 = P_A - \sigma_{S_B}^2 - \sigma_{S_C}^2. \tag{21b}$$

Now, the question is which beamforming vector for TxFJ should be chosen. If Alice has 3 antennas ($N_A=3$), then there will be only one possible dimension such that $z_A \in [\text{span}(h_{AB}, h_{AC})]^\perp$. If $N_A>3$, we end up with a multidimensional solution space for $z_A$. In this case, $\sigma_{J_A}^2$ can be evenly distributed among randomly chosen normalized vectors that are orthogonal to each other and that fully represent this space. This way, we increase the effective region of TxFJ. Note that in this case, $N_A-2$ independent TxFJ signals are generated at Alice, i.e., one TxFJ signal for each orthogonal normalized vector.

Given the above setup, we can derive the optimal $R_{sum}$ in terms of $\sigma_{S_B}^2$ and $\sigma_{S_C}^2$ for a given T and $\alpha$.

Simulation Results

To demonstrate the efficacy of our design, we provide simulation results using $N_A=3$ and $N_E=4$. The carrier frequency is set 2.4 GHz. Alice, Bob, and Charlie are located at points (3,5), (7,7), and (7,3), respectively, in a 10 meter× 10 meter area. The transmit power budgets at Alice, Bob, and Charlie, normalized to the noise power, are taken as $P_A=100$ dB, $P_B=10$ dB, and $P_C=10$ dB, respectively. Unless stated otherwise, we set $SINR_B=SIN_C=5$ dB and $\alpha=0.1$ (partial SIS). Two interference models are considered: protocol model and SINR model.

A. Protocol Model

In the protocol model, Eve's location is not known; however, if she is located inside a "vulnerability zone" of the legitimate receivers, she is immune to TxFJ. Since Alice employs zero forcing to cancel the TxFJ signal at both Bob and Charlie, this signal will be weak in that area. The authors in [17b] showed that a guard (vulnerability) zone of 19 wavelengths around a legitimate receiver is required to prevent eavesdropping. In our simulations, the guard zone is set to 10 wavelengths. We further assume that RxFJ has no effect outside this guard zone since the power of the RxFJ signal has to be small by design (especially, when SIS is imperfect). Rayleigh fading is assumed, so all channel entries are i.i.d. Circularly Symmetric Gaussian random variables (0, 1). When we only use TxFJ, Alice's normalized power budget is taken as 120 dB to make a fair comparison.

Figure 9:
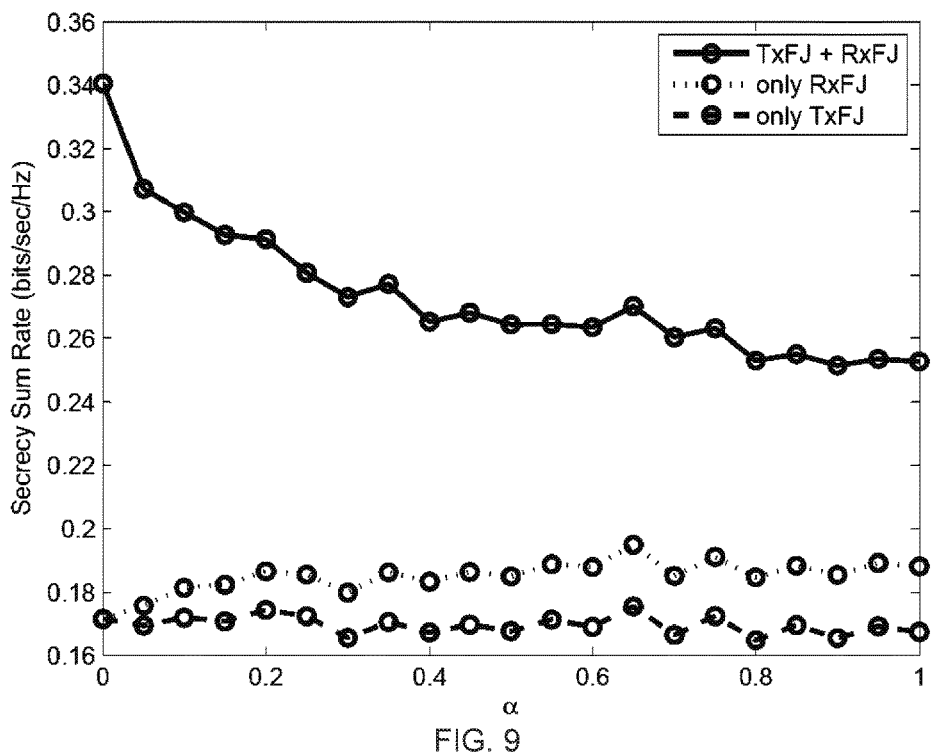
FIG. 9 depicts an exemplary effect of self-interference suppression on the secrecy sum-rate (bits/second/Hz).
Figure 10:
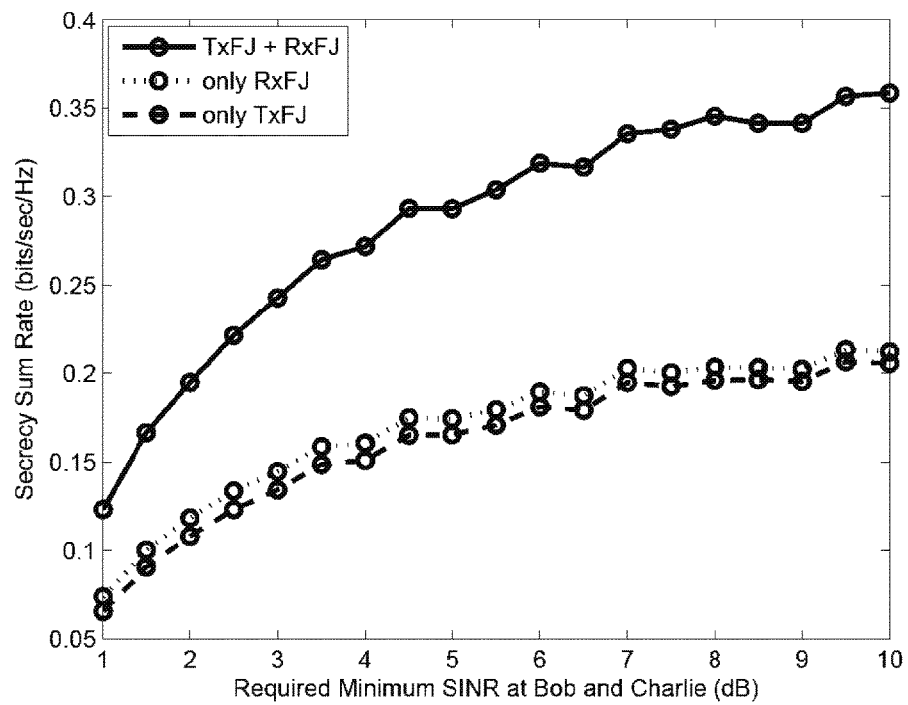
FIG. 10 depicts an exemplary effect of the minimum required SINR of the users, T, on the secrecy sum-rate (bits/second/Hz).

With the above setting, the simulation run is repeated 10000 times, each time with a different channel entries. FIG. 9 shows the secrecy sum-rate ($R_{sum}$) versus $\alpha$ for three different scenarios. The highest secrecy rate is achieved when both RxFJ and TxFJ is used. $R_{sum}$ decreases with $\alpha$ since RxFJ affects the legitimate receivers' SINR. On the other hand, the value of $\alpha$ does not have much impact on the secrecy rate when only TxFJ or RxFJ is used. Interestingly, a slightly higher secrecy rate is achieved with the RxFJ-only scheme compared to the TxFJ-only scheme, because there is only one possibility for power allocation in the latter scheme. Moreover, with the protocol model, only eavesdropping locations inside the guard zoned of Bob and Charlie impact $R_{sum}$, (since TxFJ is assumed to be nulled inside these zones). Thus, increasing the power of TxFJ will have no impact on $R_{sum}$. On the other hand, when only RxFJ is used, the allocation of powers for the data and RXFJ signals can be optimized to achieve a higher $R_{sum}$. We will later see a different behavior under the SINR model.

To investigate the effect of the minimum required SINR T, we set $\alpha$ to 0.1. As seen from FIG. 10, increasing T results in higher $R_{sum}$ for the three FJ schemes. Again, the combined Tx/Rx FJ scheme achieves the highest rate. The RxFJ-only scheme achieves a slightly better rate than that of the TxFJ only scheme, due to the same reasons mentioned before.

B. SINR Model

In this section, we consider the so-called SINR interference model, where the channel gain from each transmit antenna to each receive antenna is given by:

$$H = \left(\sqrt{10^{\frac{SL_{dB}+PL_{dB}}{10}}}\right)G \tag{22b}$$

where the quantity between the parenthesis represents the large-scale fading effects, with $SL_{dB}$ and $PL_{dB}$ representing the loss in dB due to shadowing and the path loss, respectively. The second term, $G \sim \mathcal{CN}(0,1)$, represents small-scale fading effects. Shadowing is assumed to be log-normal with 8 dB standard deviation, $SL_{dB} \sim 8N(0,1)$; on the other hand, the path loss is modeled as $PL_{dB}=-20 \log_{10}(d)$ where d is the distance between the transmit and receive antennas. We set $P_A=100$ dB, $P_B=10$ dB, and $P_C=10$ dB, are normalized to the noise power. We consider full self-interference suppression and T=5 dB. In TxFJ-only case, the receivers have no power, and $P_A$ is set to 120 dB to maintain the total power budget in the network.

Figure 11:
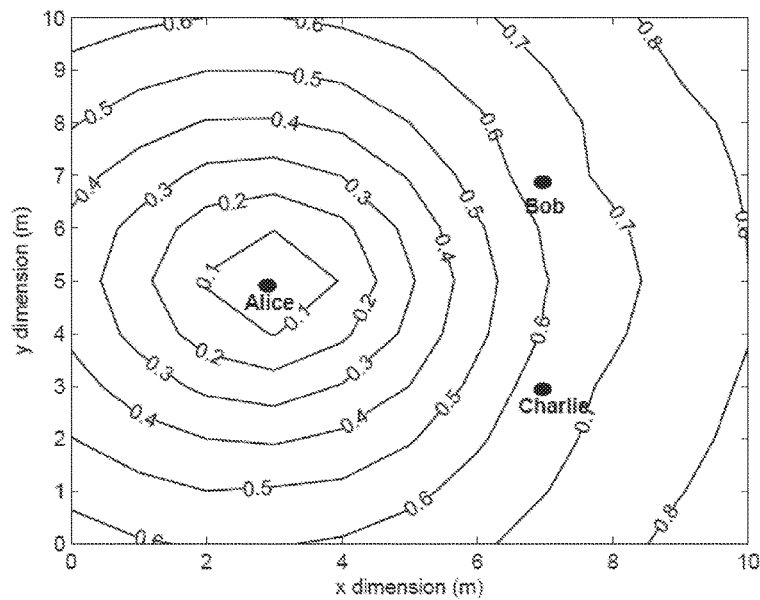
FIG. 11 shows exemplary contours of secrecy sum-rate in (bits/second/Hz) for various locations of Eve (Rx FJ+Tx FJ).
Figure 12:
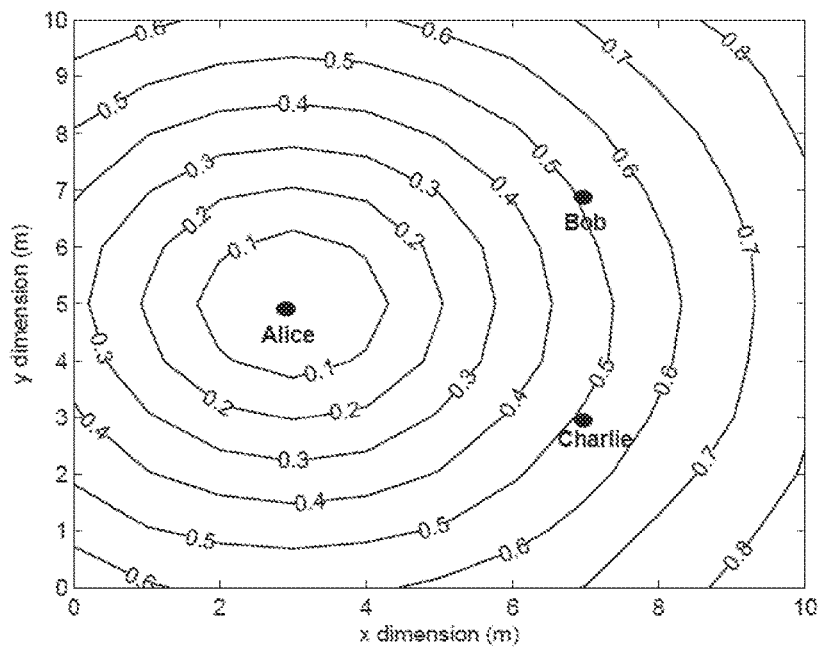
FIG. 12 shows exemplary contours of secrecy sum-rate in (bits/second/Hz) for various locations of Eve (Tx FJ).
Figure 13:
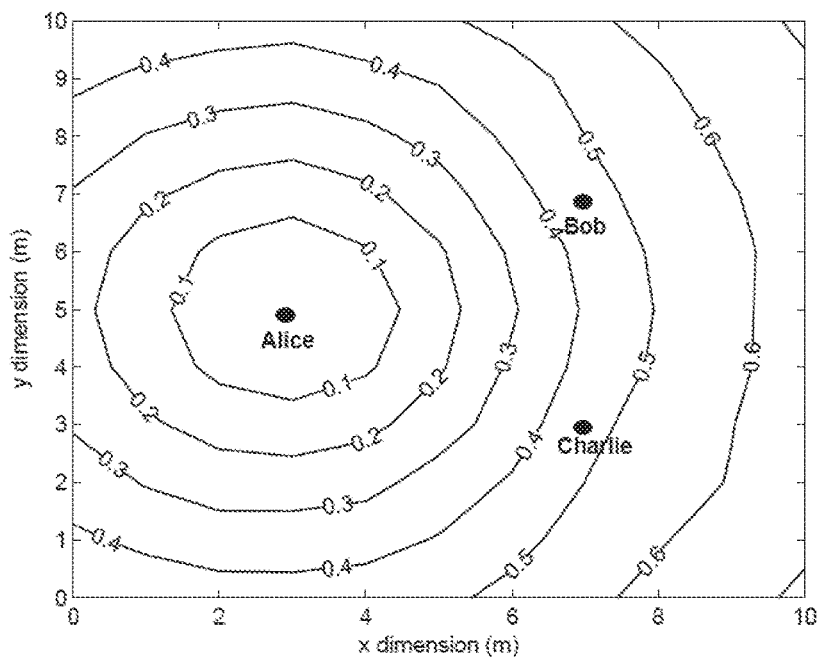
FIG. 13 shows exemplary contours of secrecy sum-rate in (bits/second/Hz) for various locations of Eve (Rx FJ).

FIGS. 11, 12 and 13 show the contours of the achievable secrecy sum-rate according to Eve's location under three different FJ schemes. In each figure, the locations of Alice, Bob and Charlie are specified. We make a few observations. First, in FIG. 12, the contour lines have a circular shape around Alice, as expected, since only TxFJ is used. On the other hand, in FIG. 11, the contour lines are not symmetric around Alice. Rather, they are ellipsoid-like with right centres around Alice, since RxFJ pushes the contour lines towards Alice. As a result, the performance of RxFJ+TxFJ is always better than the others even if the total power budget is kept constant. In FIG. 13, the contours have a circular shape around Alice except for when they are near to Bob and Charlie. When Eve is between Alice and Bob/Charlie or farther from Bob/Charlie, the TxFJ-only scheme achieves a higher secrecy sum-rate than the RxFJ-only scheme. However, if Eve is around the receivers, the performance of both schemes is similar since RxFJ degrades the SINR of Eve.

Proof of Theorem 2

Encoder:

Here, we design the codewords (signals) $s_B^N$ and $s_C^N$ carrying the secure messages to Bob and Charlie ($M_B$ and $M_C$), respectively. The encoding is designed such that $P_{e,i}=\text{Prob}\{\hat{M}_i \neq M_i\} \to 0$ as $N \to \infty$ where $\hat{M}_i$ is the estimate of $M_i$ at receiver i, and $$\frac{1}{N}I(M_B, M_C; Z^N | H) \to 0, \tag{23b}$$

as $N \to \infty$ (here, H refers to channel states). This is the secrecy constraint implying that the mutual information leakage rate to the eavesdropper is made vanishing as the number of channel uses, N, gets large.

The channels given in (13b) and (16b) can be summarized as $$y_B^{(j,t)} = h_B^{(j,t)} s_B^{(j,t)} + n_B^{(j,t)} \tag{24b}$$

$$y_C^{(j,t)} = h_C^{(j,t)} s_C^{(j,t)} + n_C^{(j,t)} \tag{25b}$$

$$y_E^{(j,t)} = h_1^{(j,t)} s_B^{(j,t)} + h_2^{(j,t)} s_C^{(j,t)} + n_E^{(j,t)}, \tag{26b}$$

where (j,t) indicates channel coherence interval (fading block) $j \in \{1, \ldots, J\}$ and time instant $t \in \{1, \ldots, T\}$. That is, channel use index $n=(j-1)T+t$ for (j, t)-th channel use, and total number of channel uses is $N=JT$. This is a block fading interference channel where interference links are removed, and we'll use techniques in [15b] and [14b] to build encoder. In particular, the signals $s_B$ and $s_C$ share the randomness needed to confuse the eavesdropper as in [14b] and designed as in [15b] to overcome fading limitations and absence of eavesdropper CSI.

Let $R_B = \mathcal{I}(S_B; Y_B|H) = \mathbb{E}[\log(1+\text{SINR}_B)]$. We generate all binary sequences $\{v_B\}$ each of length N. $R_B$, and then, independently assign each of them uniformly randomly to one of $2^{nR_B^s}$ groups. Given the secret message $M_B \in \{1, \ldots, 2^{nR_B^s}\}$, a sequence $v_B$ is randomly selected from the group $M_B$. This $v_B$ is divided into J blocks $v_B = [v_B(1), \ldots, v_B(j), \ldots, v_B(J)]$, where each block $v_B(j)$ has $T \log(1+\text{SINR}_B^{(j)})$ bits, and transmitted in j-th fading block. To transmit these bits in block j, Alice uses random Gaussian codebook consisting of $2^{T \log(1+\text{SINR}_B^{(j)})}$ codewords $s_B^{(j)}$ each of length T. Then, the transmitted signal is given by $s_B^N = (s_B^{(1)}, \ldots, s_B^{(J)})$. A similar scheme is used to construct the signal $S_C^N$.

Decoder:
Bob can decode each message for j-th fading block (as the rate supports channel capacity), and jointly typical decoding will succeed with high probability as $T \to \infty$. Then, union bound will imply that all messages can be recovered, from which $v_B$ can be reconstructed and the bin index $M_B$ can be declared as the decoded message. Charlie will use the same scheme to reliably decode $M_C$.

Security:
(Proof Sketch) Consider the following:

$$\mathcal{I}(M_B, M_C; Y_E^N | H) = H(M_B, M_C H) - H(M_B, M_C | Y_E^N, H) \quad (27b)$$

$$\overset{(a)}{\leq} H(M_B, M_C | H) - \mathcal{I}(M_B, M_C; X_S^N | Y_E^N, H)$$

$$= H(M_B, M_C) - H(X_S^N | Y_E^N, H) +$$

$$H(X_S^N | Y_E^N, M_B, M_C, H)$$

$$\overset{(b)}{=} H(M_B, M_C) - \sum_{j=1}^{J} H(X_S^{(j,1:T)} | Y_E^{(j,1:T)}, H) +$$

$$H(X_S^N | Y_E^N, M_B, M_C, H)$$

$$= H(M_B, M_C) - \sum_{j=1}^{J} [H(X_S^j | H) -$$

$$\mathcal{I}(X_S^j; Y_E^j | H)] + H(X_S^N | Y_E^N, M_B, M_C, H)$$

$$\leq H(M_B, M_C) - \sum_{j=1}^{J} \left(T([R_B^j - R_{E,B}^j]^+) +\right.$$

$$\left. T([R_C^j - R_{E,C}^j]^+)\right) + H(X_S^N | Y_E^N, M_B, M_C, H)$$

$$\overset{(c)}{=} H(X_S^N | Y_E^N, M_B, M_C, H)$$

$$\overset{(d)}{\leq} N\epsilon,$$

where (a) follows as $H(M_B, M_C|X_S^N, Z^N, H) \geq 0$, where $X_S^N \triangleq v_B^N s_B^N + v_C^N s_C^N$. (b) follows due to memoryless channel and independence signals. (c) follows by choosing secrecy rates $H(M_B)=JT \mathbb{E}[R_B^j - R_{E,B}^j]$ and $H(M_C)=JT \mathbb{E}[R_C^j - R_{E,C}^j]^+$ and by taking $J \to \infty$ and $T \to \infty$, as time average converges to expected value due to ergodicity of the channel. (d) follows by Fano's inequality as the eavesdropper can decode signals $s_e$ and $s_C$ by employing a list decoding (similar to [14b]). In particular, consider $H(X_S^N|Z^N, M_B, M_C, H) = H(S_B^N|Z^N, M_B, M_C, H) + H(S_C^N|Z^N, S_B^N, M_B, M_C, H)$. Here, both terms on the right can be shown to be vanishing if the secrecy rates $R_B^S$ and $R_C^S$ satisfy $R_B^s = \mathbb{E}[R_B^j - R_{E,B}^j]^+ - \delta$ and $R_C^s = \mathbb{E}[R_C^j - R_{E,C}^j]^+ - \delta$. Then, Fano's inequality will imply that $$\frac{1}{N} \mathcal{I}(M_B, M_C; Z^N | H) \leq \epsilon \quad (28b)$$

for arbitrarily small $\in$ as $N \to \infty$, which proves the secrecy.

In this embodiment, we considered the scenario where a transmitter sends two independent confidential data streams, intended to two legitimate users, in presence of an eavesdropper of an unknown location. With the knowledge of that the security applications require guard zones around receivers up to 19 wavelengths, we proposed using RxFJ along with TxFJ. That way, even if an eavesdropper has a highly correlated channel with that of any legitimate receiver and is able to cancel out TxFJ, RxFJ keeps providing confidentiality for the information messages. TxFJ is still needed since a transmitter generally has much more power than mobile receivers. Therefore, it can provide PHY security over a larger area. To be able to send RxFJ from the receivers, we considered full-duplex receivers, but with one antenna per receiver. These receivers are capable of partial/complete self-interference suppression.

We used zero-forcing technique not only to remove the TxFJ interference at intended receivers but also to hide the information messages from the unintended receivers. An optimization problem was formulated for the power allocations of the two information signals, the TxFJ signal, and the two RxFJ signals with the goal of maximizing the secrecy sum-rate. Assuming that the legitimate links demand a certain SINR such that their achieved data rates remain constant, and they achieve no data rate below this SINR threshold, we provided the optimal solution for this problem.

Example 3

The following is a non-limiting example of friendly jamming for PHY-layer security in small-scale multi-link wireless networks in the presence of eavesdroppers.

Distributed MIMO for FJ Nullification

If the FJ signals are to be generated by the same MIMO node (e.g., Alice), then the phases of these signals can be easily controlled to provide the desired nullification. A set of FJ signals can add destructively and nullify each other at an intended receiver if these signals, each of which traverses a different channel, are received out-of-phase and sum up to zero. To achieve this, techniques such as zero-forcing beamforming are employed to determine the phase and amplitude of each FJ signal at the transmit antennas. However, in general, FJ signals may be produced by different devices that do not share a reference clock and so are not synchronous. Hence, the signals transmitted from distributed FJ nodes may experience unknown random delays. In this section, we explain how we synchronize FJ devices, each equipped with a single antenna, and establish the sufficient conditions on the jamming signals to ensure nullification of FJ signals at all legitimate receivers.

A. Synchronization of FJ Devices

To enable synchronized FJ devices, we exploit Source-Sync's synchronization protocol proposed and empirically demonstrated in [9c] for OFDM systems. According to this method, a set of distributed cooperative transmitters chooses a leader, who initiates the synchronization process by transmitting an OFDM-based sync header. Using the phase offsets measured across different subcarriers, each cooperating transmitter can estimate the exact arrival time of the sync header. Based on the estimated RTT between each transmitter and the leader, and the switching time from Rx mode to Tx, each transmitter synchronizes in time with the leader. Finally, considering the propagation delay of the cooperative transmitters to the receiver, each transmitter selects a transmission time so as to synchronize the arrival of all the transmissions at the receiver.

B. Nullification of FJ Signals

Assuming that the distributed FJ nodes have been synchronized, the amplitudes/phases of their signals must be adjusted to cancel out at the legitimate receivers. Consider M legitimate receivers and N FJ nodes. The channel is characterized by an M×N channel matrix $H=[h_{ij}]$; where $h_{ij}$ is the channel coefficient between receiver i and transmitter j. By setting N=M+1, we can guarantee a nonempty null space for the channel matrix H [3c]. Let y be an M-by-1 vector that represents only the received FJ signals at the M receivers, let t be an N-by-1 vector that represents the transmitted signals from the N FJ antennas, and let F represent the N-by-1 precoding vector (precoder) of the FJ signal.

At any time instant (time index is dropped for simplicity) and ignoring the effect of noise, we have:

$$y=Ht=HFm \quad (1c)$$

where m denotes a random complex scalar at the current time and $\|m\|^2=1$. The Singular Value Decomposition (SVD) of H can be obtained as $$H=U_{M \times M} \Sigma_{M \times N} V_{N \times N}^{\dagger}. \quad (2c)$$

Thus, y can be expressed as:

$$y=U\Sigma V^{\dagger} t. \quad (3c)$$

If the jamming precoder F lies in the null space of H, then y=Ht=0. In our design, we select F as the rightmost column of the matrix V, i.e., the kernel of H. For a given total budget on the jamming power and a given m, the precoder F determines the phase of each of the FJ signals and implies some dependencies between their jamming powers so that they add up destructively at the legitimate receivers. Let $P_j=\|t_j\|^2=\|F_j\|^2$ be the jamming power of the jth FJ device. We explicitly derive these dependencies by solving $\Sigma_{j=1}^{N} h_{ij} t_j=0$, $\forall i=1, \ldots, M$. It turns out that each jamming power must be a linear function of $P_1$ as follows:

$$P_j=\omega_j P_1, \forall j=2, \ldots, N \quad (4c)$$

where $\omega_j$ is the scalar ratio between $P_j$ and $P_1$.

Network Model and Problem Formulation

We consider a static multi-link network, consisting of an arbitrary number of legitimate nodes, each equipped with an omni-directional antenna. These nodes form a set of links $\mathcal{L}$. Each link l consists of a source (Alice) and a destination (Bob). This general multi-link network model accommodates both P2P and multihop scenarios. For the P2P scenario, $\mathcal{L}$ consists of several independent single-hop links, connecting different Alice-Bob pairs. In the multihop case, $\mathcal{L}$ contains specific links that form several paths between various pairs of nodes. Along with the set $\mathcal{L}$, there is a finite set $\varepsilon$ of eavesdropping locations and a set $\mathcal{J}$ of FJ nodes. We adopt a 2-D discrete model for the points in $\varepsilon$ [6c], [7c]. The probability that an eavesdropper is in location $e \in \varepsilon$ is denoted by $p_e$. Even though this model assumes some (probabilistic) knowledge of the eavesdroppers' locations, it can represent numerous scenarios by adjusting the number of locations and the probability assigned to each location.

The number of FJ devices can be less than or greater than $|\varepsilon|$. In this embodiment, however, we only consider the case when $|\varepsilon|>|\mathcal{J}|$, since the solution for the other cases is trivial: Assign an FJ node to each of the possible eavesdropping locations. In contrast to previous research [6c], [7c], we assume that there can be more than one eavesdropping location per active link, i.e., $\Sigma_{e \in \varepsilon} p_e$ can be greater than one.

A. Problem Formulation

We formulate the optimal placement and power allocation problem for the FJ devices such that the average SINR at each location e is less than a threshold $\pi$, and FJ interference is nullified at legitimate receivers. We consider the case of cooperative FJ whereby FJ devices cooperatively nullify their jamming signals at all $|\mathcal{L}|$ receivers, even if only a subset of these receivers are active. We employ the Source-Sync protocol [9c] to synchronize the FJ devices. Source-Sync was initially designed to exploit sender diversity by transmitting the same packet from multiple cooperative senders. However, in our design, we leverage it to sync the FJ nodes. The leader will be an active data transmitter (Alice), who sends a sync header together with a random m before its main transmission. The power of the sync-header's transmission must be adjusted to reach all FJ nodes. Following the receipt of this header, FJ nodes calculate their transmission times to synchronize and create a null region around all $|\mathcal{L}|$ receivers.

Henceforth, when we say Alice and Bob we mean the transmitter and respective receiver of a specific link $l \in \mathcal{L}$, respectively. Because the FJ signals are nullified at Bob, the transmission power of Alice is only a function of the SINR threshold at Bob and the distance between Alice and Bob of link l, denoted by $d_l$ (assuming a pathloss channel model). Therefore, to maintain the SINR at Bob≥some threshold $\beta$, the minimum transmission power at Alice of link l, denoted by $P_{t,l}$, is given by:

$$P_{t,l} = \frac{N_o \beta}{d_l^{-\alpha}}. \quad (5c)$$

where $N_o$ is AWGN power and $\alpha$ is the pathloss exponent.

For the case of cooperative jamming, the SINR at Bob ($SINR_b$) is given by:

$$SINR_b = \frac{P_{t,l} d_l^{-\alpha}}{N_o}. \quad (6c)$$

The optimization problem can now be stated as follows:

$$P1: \min_{\{x_j, y_j, P_j \forall j \in \mathcal{J}\}} \sum_{j \in \mathcal{J}} P_j \quad (7c)$$

subject to C1: $p_e SINR_e \leq \pi, \forall e \in \varepsilon, \forall l \in \mathcal{L}$ C2: $\sum_{j=1}^{|\mathcal{J}|} h_{ij} t_j = 0, i=1, \ldots, |\mathcal{L}|$ where $(x_j, y_j)$ are the Cartesian coordinates of FJ node j. Constraints C1 and C2 represent the secrecy and nullification constraints, respectively. When link l is active, the SINR at eavesdropper e ($SINR_e$) is given by:

$$SINR_e = \frac{P_{t,l} d_{ae,l}^{-\alpha}}{N_o + \sum_{j \in \mathcal{J}} P_j d_{je}^{-\alpha}} \quad (8c)$$

where $\alpha$ is the pathloss exponent, $d_{ae,l}$ is the distance between Alice (of link l) and eavesdropping location e, and $d_{je}$ is the distance between the FJ node j and eavesdropper e. Note that j, e, and hence $d_{je}$ are not associated with a specific link l.

We propose two schemes based on formulation P1: per-link and network-wide schemes. For the per-link scheme, the problem is solved independently for each link. In this case, we have $|\mathcal{L}|$ independent problems. For each of these problems, the secrecy and nullification constraints are considered only for a specific link l, i.e., $|\mathcal{L}|=1$. To ensure a nonempty nullspace for the channel matrix H, $|\mathcal{J}|$ has to be greater than $|\mathcal{L}|$. This implies that in the per-link scheme, $\mathcal{J}$ in each problem must contain a minimum of two FJ nodes. Hence, we need at least $2|\mathcal{L}|$ FJ nodes to secure all links. For the network-wide scheme, all links and FJ devices are simultaneously considered in the secrecy and nullification constraints, i.e., we jointly optimize over all links in the set $\mathcal{L}$. One advantage of this scheme is that we only need $|\mathcal{L}|+1$ FJ nodes to ensure that the jamming signals are nullified at all $|\mathcal{L}|$ legitimate receivers.

Considering the network-wide scheme and assuming that the locations of legitimate nodes are known and $P_{t,l}$ is known $\forall l \in \mathcal{L}$. Thus, the first constraint can be reformulated as:

$$C1: \; p_e \frac{\max_{l \in \mathcal{L}} P_{t,l} d_{ae,l}^{-\alpha}}{N_o + \sum_{j \in \mathcal{J}} P_j d_{je}^{-\alpha}} \leq \pi, \; \forall e \in \varepsilon. \quad (9c)$$

B. Signomial Programming

Before we explain how the optimization problem P1 can be solved, we take a detour and discuss a class of optimization problems known as signomial programming. A function $f$ is said to be monomial in the variables $x_1, x_2, \ldots, n_n$ if:

$$f(x_1, x_2, \ldots, x_n) = x_1^{a_1} x_2^{a_2} \ldots x_n^{a_n} = \prod_{i=1}^{n} x_i^{a_i} \quad (10c)$$

where $a_1, a_2, \ldots, a_n$ an are some real-valued numbers. A function h is said to be posynomial in the variables $x_1, x_2, \ldots, x_n$ if it can be written as a linear combination of monomials, i.e., $$h(x_1, x_2, \ldots, x_n) = \sum_{k=1}^{n} c_k f_k(x_1, x_2, \ldots, x_n) \quad (11c)$$

where $c_k \in \mathbb{R}^+$ and $f_k$ is monomial in the variables $x_1, x_2, \ldots, x_n$.

Geometric program is a class of non-convex, non-linear optimization problems that can be written in the following standard form [10c, [11c]:

$$\begin{aligned} \underset{x}{\text{minimize}} \quad & h_o(x) \\ \text{subject to} \quad & C1: \; h_i(x) \leq f_i(x), \; i = 1, 2, \ldots, I \\ & C2: \; g_k(x) \leq q_k(x), \; k = 1, 2, \ldots, K \end{aligned}$$

where $x \triangleq (x_1, x_2, \ldots, x_n)$; $h_o$ and $h_i$ are posynomials; I and K are two arbitrary integer numbers; and $f_i$, $g_k$ and $q_k$ are monomials. Note that by change of variables, the standard form geometric program can be transformed into a convex problem, thus a global optimum can be computed efficiently.

The standard form geometric program requires that each and every posynomial be upper bounded by a monomial. Signomial programming is a generalized form of posynomial geometric programming in which the posynomials may be lower bounded by monomials. Signomial problems cannot be transformed to convex problems through a change of variables; they are non-linear, non-convex problems that are generally NP-hard. One approach of solving signomial programs is by using condensation techniques [12c], which approximate any posynomial function into a monomial function. This approximation reduces the problem to the standard geometric form.

Proposition III.1.

Problem P1 is a signomial programming problem with $|\varepsilon|+|\mathcal{L}|$ signomial constraints.

Proof.

The objective function is a summation of linear variables (i.e., $\Sigma_{j \in \mathcal{J}} P_j$). As for the secrecy constraint, we have $\forall e \in \varepsilon$:

$$P_e SINR_e \leq \pi \quad (12c)$$

$$p_e \frac{P_{t,l} d_{ae,l}^{-\alpha}}{N_o + \sum_{j \in \mathcal{J}} P_j d_{je}^{-\alpha}} \leq \pi \quad (13c)$$

$$\frac{p_e P_{t,l} d_{ae,l}^{-\alpha}}{\pi} \leq N_o + \frac{P_1}{d_{1e}^{\alpha}} + \frac{P_2}{d_{2e}^{\alpha}} + \ldots + \frac{P_{|\mathcal{J}|}}{d_{|\mathcal{J}|e}^{\alpha}} \quad (14c)$$

$$\left(\frac{p_e P_{t,l} d_{ae,l}^{-\alpha}}{\pi}\right) d_{1e}^{\alpha} d_{2e}^{\alpha} \ldots d_{|\mathcal{J}|e}^{\alpha} \leq N_o (d_{1e}^{\alpha} d_{2e}^{\alpha} \ldots d_{|\mathcal{J}|e}^{\alpha}) + \\ P_1(d_{2e}^{\alpha} \ldots d_{|\mathcal{J}|e}^{\alpha}) + \ldots + P_{|\mathcal{J}|}(d_{1e}^{\alpha} d_{2e}^{\alpha} \ldots d_{(|\mathcal{J}|-1)e}^{\alpha}) \quad (15c)$$

$$\left(\frac{p_e P_{t,l} d_{ae,l}^{-\alpha}}{\pi}\right) \prod_{j \in \mathcal{J}} d_{je}^{\alpha} \leq N_o \left(\prod_{j \in \mathcal{J}} d_{je}^{\alpha}\right) + \sum_{j \in \mathcal{J}} P_j \prod_{\substack{i \in \mathcal{J} \\ i \neq j}} d_{ie}^{\alpha} \quad (16c)$$

$$\frac{\left(\frac{p_e P_{t,l} d_{ae,l}^{-\alpha}}{\pi}\right) \prod_{j \in \mathcal{J}} d_{je}^{\alpha}}{N_o \left(\prod_{j \in \mathcal{J}} d_{je}^{\alpha}\right) + \sum_{j \in \mathcal{J}} P_j \prod_{\substack{i \in \mathcal{J} \\ i \neq j}} d_{ie}^{\alpha}} \leq 1, \quad (17c)$$

which is in the form of:

$$\frac{Q(x)}{P(x)} \leq 1 \quad (18c)$$

where $Q(x)$ and $P(x)$ are monomial and posynomial, respectively.

It follows that our formulation belongs to the category of signomial programming, in which the posynomial is lower-bounded by a monomial. The same analysis can be applied to the nullification constraint to show that it also represents $|\mathcal{L}|$ reversed posynomial constraints.

Solution Based on Condensation Techniques

In this section, we attempt to solve P1 in a sub-optimal fashion by approximating the signomial problem as a standard geometric program using condensation techniques. The basic idea in condensation is to approximate a multi-term posynomial by a monomial or by a single-term function [12c]. The arithmetic/geometric mean inequality is the key element in the condensation process. It is given by the following expression:

$$\delta_1 V_1 + \delta_2 V_2 + \ldots + \delta_k V_k \geq V_1^{\delta_1} V_2^{\delta_2} \ldots V_k^{\delta_k} = \prod_{i=1}^{k} V_i^{\delta_i} \quad (19c)$$

where k is the number of terms and $$V_i, \delta_i \in \mathbb{R}^+ \text{ for } i = 1, 2, \ldots, k. \text{ Let } U_i \stackrel{def}{=} \delta_i V_i.$$

Then, $$\sum_{i=1}^{k} U_i \geq \prod_{i=1}^{k} \left(\frac{U_i}{\delta_i}\right)^{\delta_i} \quad (20c)$$

$$U_i > 0, \delta_i > 0 \quad (21c)$$

$$\sum_{i=1}^{k} \delta_i = 1. \quad (22c)$$

Consider the following generalized reversed geometric program:

$$\text{minimize } x_o \quad (23c)$$
$$\text{subject to } \frac{Q(x)}{P(x)} \leq 1$$

where $x_o$ is a linear objective function, and both Q(x) and P(x) are posynomials. The objective is to condense P(x) into a monomial. The resulting constraint is a posynomial that is upper-bounded by a monomial, i.e., it is in a standard convex form of a geometric program.

Using condensation techniques, P(x) can be written as a weighted sum of monomials:

$$P(x) = \sum_{i=1}^{k} P_i(x) = \sum_{i=1}^{k} c_i \prod_{n=0}^{N} x_n^{a_{in}} \quad (24c)$$

where $c_i$ is a positive number that represents the weight of the ith term, N denotes the number of variables, and $a_{in} \in \mathbb{R}$ is the exponent associated with the nth variable in the ith term of the posynomial.

Let $P_i(x) = U_i$. It follows that $P(x) = \sum_{i=1}^{k} P_i(x) = \sum_{i=1}^{k} U_i$. Using the arithmetic/geometric inequality, P(x) can be written as:

$$P(x) \geq \prod_{i=1}^{k} \left(\frac{U_i}{\delta_i}\right)^{\delta_i} \quad (25c)$$

where $\delta_i$ is defined as:

$$\delta_i = \frac{P_i(x^*)}{P(x^*)} \quad (26c)$$

and x* is the solution vector of the last condensation iteration. After some basic manipulation, we end up with the following inequality:

$$P(x) \geq P(x^*) \prod_{n} \left\{ \left(\frac{x_n}{x_n^*}\right)^{\frac{\sum_{i=1}^{k} a_{in} P_i(x^*)}{P(x^*)}} \right\} \quad (27c)$$

where P(x*), $\Pi_n x_n^*$, and $\Sigma_{i=1}^{k} a_{in} P_i(x^*)$ are all known quantities given that x* is known.

Given the inequality (27c), the solution space of the condensed problem is entirely contained in the solution space of the original problem. It follows that any optimal solution to the condensed problem is essentially a feasible but not necessary optimal solution to the original problem (x* is an upper bound on the minimum value of the objective function of the original problem).

The solution to the original problem can be heuristically found by iteratively updating the parameters of the condensed problem and solving it. For each iteration, we use the optimal solution of the previous condensed problem to update the approximation parameters, and so on until we converge to the optimal solution of the original problem. Because the problem is non-convex, the algorithm may converge to a local minima. Improving signomial programming algorithms to avoid being stuck at a local minimum is left for future work. x* is initially chosen as a feasible vector to the main problem.

Secure Routing Problem

Considering the per-link scheme jointly optimizing the transmission powers and locations of the FJ devices in the multihop scenario, we propose to use the total FJ power needed to secure each link as the link weight. Thus, for link $l \in \mathcal{L}$, its weight is:

$$w(l) = \sum_{j \in \mathcal{J}} P_j. \quad (28c)$$

By securing each hop, end-to-end secrecy is achieved [5c], [13c]. At the same time, the quality of service is ensured by having the SINR at each end of a link lower-bounded by β. To find a secure path $\mathcal{P}$ with minimum total FJ power for a given source and destination, we run the shortest path algorithm with respect to the metric w. The cost of the resultant path $c(\mathcal{P})$ is calculated as follows: $c(\mathcal{P}) = \Sigma_{l \in \mathcal{P}} w(l)$ Performance Evaluation The simulation results of the perlink optimization strategy (both P2P and multihop) are provided herein. We also compare the per-link P2P to the network-wide P2P scenarios. We set $\alpha=2$ and $P_e=0.5$ for each eavesdropping location, β=1 and π=1. The number of condensation iterations is set to 100. All power values are normalized with respect to No (the power of the AWGN). FJ nodes are initially placed at the locations of the data transmitters, but gradually re-positioned depending on the outcome of the optimization procedure. The simulations are performed using the CVX package in MATLAB.

A. Per-Link, P2P Simulations

We first study the performance of our proposed per-link scheme for P2P scenarios in terms of power consumption and interference at legitimate receivers. The network consists of 1 to 5 unidirectional links (see FIG. 15). The set of eavesdropping locations is indicated by the diamonds in FIG. 15. The network is deployed on a grid of dimensions $2|\mathcal{L}|+1) \times 5$ (e.g., when $|\mathcal{L}|=1$, we simulate a grid of dimension 3×5, with four potential eavesdropping locations).

1) Power Consumption:

We compare our proposed per-link P2P scheme with the following schemes that use fixed locations for the FJ devices:

Tx-based FJ: In this scheme, FJ nodes are co-located with the transmitter, which could be a MIMO transmitter with some antennas dedicated to the FJ.

Rx-based FJ: In this case, the FJ nodes are placed at full-duplex receivers with perfect self-interference cancellation.

Centroid: Here, the FJ nodes are placed at the centroid of all potential eavesdropping locations.

Figure 16:
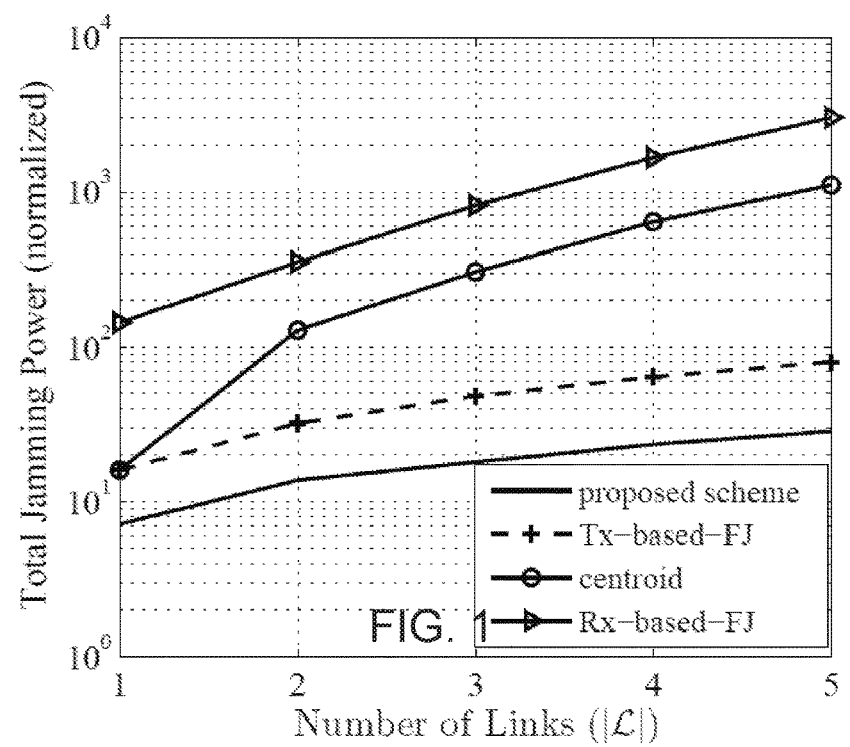
FIG. 16 shows an exemplary total jamming power vs. number of links for the P2P scenario (per-link).

Collectively, we refer to the above three schemes by fixed placement schemes. As shown in FIG. 16, our proposed per-link P2P scheme outperforms the fixed-placement schemes achieving 55%-99% reduction in power consumption. The centroid scheme is the worst in terms of power consumption because FJ nodes are located far away from data transmitters. Thus, these FJ nodes need to increase their powers to cover eavesdropping points around data transmitters.

Figure 18:
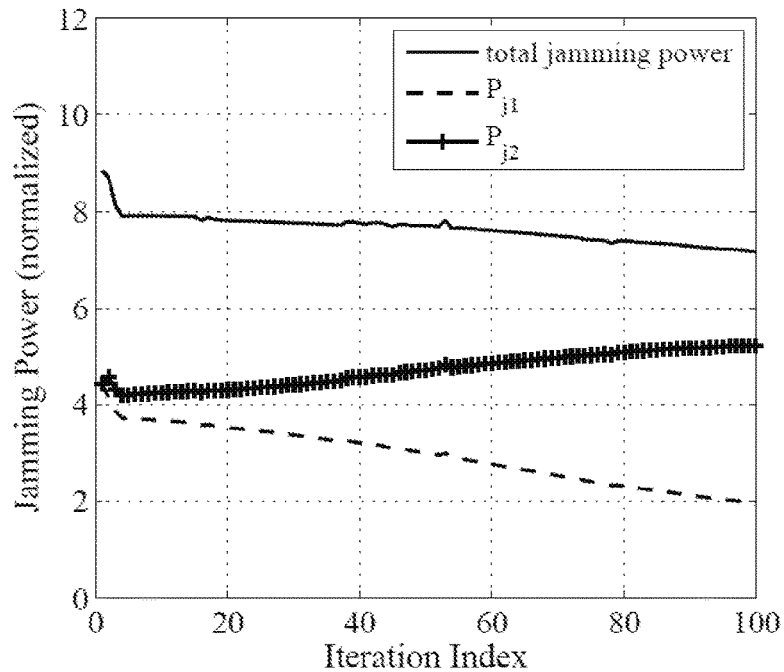
FIG. 18 shows exemplary jamming power of each FJ node along with total jamming power vs. iteration for the example in FIG. 17.

To illustrate the outcome of the proposed per-link P2P case, we consider a network of one link (i.e., $|\mathcal{L}|=1$), as shown in FIG. 17. Numbers close to each node in this figure represent the amount of interference caused by the FJ nodes on that node. In FIG. 18, we show the change in the jamming power for each of the FJ nodes of FIG. 17 along with their total jamming power as a function of the optimization iteration. The increase of $P_{j2}$ may look counterintuitive because FJ2 is moving towards Eve1 and Eve2. FJ1 moves closer to Bob as it moves towards Eve3 and Eve4 to reduce $P_{j1}$ required to suppress them. According to Eq. 4c, $P_{j2}=P_{j1}(h_{11}/h_{12})^2$; thus, as FJ1 moves closer to Bob, $P_{j2}$ increases quadratically with $h_{11}/h_{12}$. This prevents FJ2 from moving closer to Eve1 and Eve2 because the objective is to minimize the total jamming power.

Figure 19:
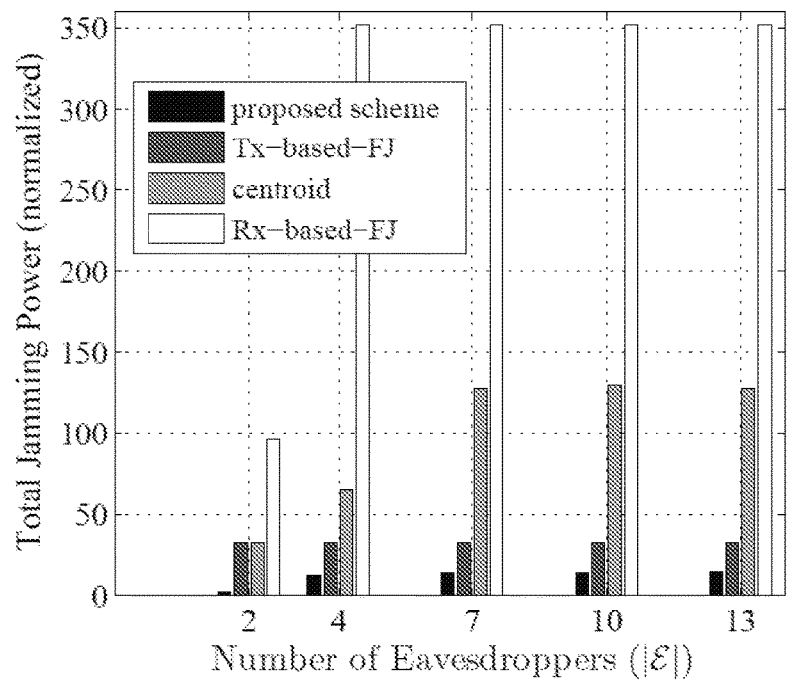
FIG. 19 depicts power consumption vs. number of potential eavesdropping locations for the case of two P2P links (per-link).

In FIG. 19, we vary $|\varepsilon|$ for the two-link P2P case and study the performance of our proposed per-link scheme in terms of power consumption. Our proposed scheme is shown to reduce power consumption by 54%-96% compared to fixed placement schemes. It can be noted that the jamming power for the Tx-based FJ scheme does not scale with the number of eavesdroppers. This is because FJ nodes are located very close to data transmitters, thus jamming power will be a function of the transmit power (in P1 substitute $d_{je}=d_{aej}$, $\forall j \in \mathcal{J}$). Note that the transmit power $P_{t,l}$ does not scale with the number of the eavesdroppers.

2) Interference at Legitimate Receivers:

Because FJ nullification is incorporated in our formulation, the SINR at the receiver of any link should not be less than β. Considering the example in FIG. 17, the SINR at Bob in the proposed per-link scheme was maintained at 1 with received jamming power of $2.7 \times 10^{-6}$. For the Tx-based and centroid schemes, however, FJ is hardly nullified and the SINR goes down to 0.5 dB, which means that Bob is unable to decode Alice's messages.

B. Per-Link, Multihop (Routing) Simulations

Figure 20:
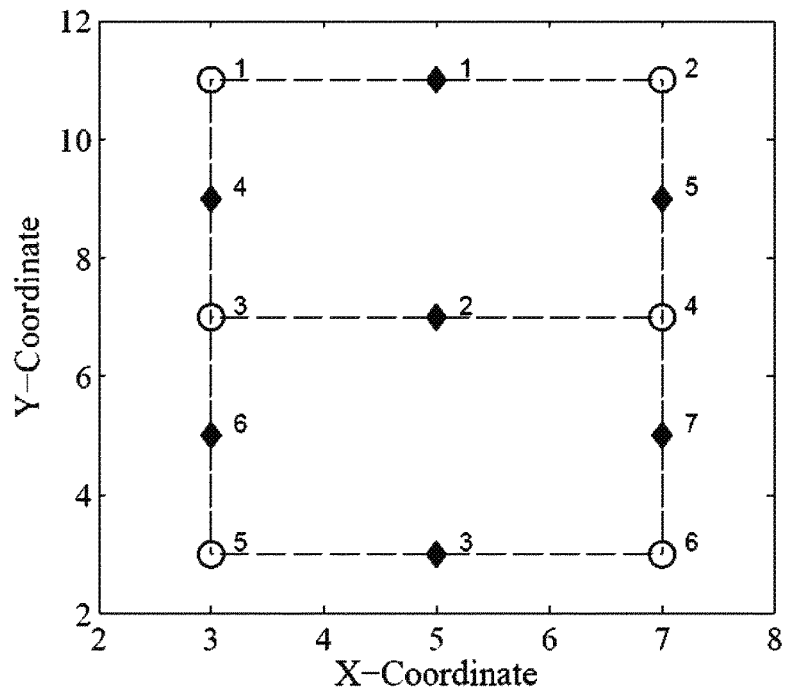
FIG. 20 shows an example of a Network topology for routing simulations. Hollow circles represent the legitimate nodes and diamonds represent potential eavesdropping locations.

We simulate a multihop network consisting of three interconnected and bidirectional links, as shown in FIG. 20. We calculate the minimum energy route and its associated jamming power for a packet transmitted from node 1 to node 6 along a multipath route. We also calculate $\mathbb{E}[c(\mathcal{P})]$ for all possible paths $\mathcal{P}$ (i.e., all possible Tx-Rx pairs). A summary of the results is shown in Table I.

Table I. Comparison of the Proposed Per-Link Scheme and the Fixed-Placement Schemes in Terms of the Cost of the Minimum-Energy Path

|  | Proposed | Tx-based FJ | Centroid | Rx-based FJ |
|---|---|---|---|---|
| Path | 1-2-4-6 | 1-2-4-6 | 1-3-4-6 | 1-2-4-6 |
| Cost | 7 | 48 | 128 | 304 |
| $\mathbb{E}[c(\mathcal{P})]$ | 5.5 | 26.7 | 75.5 | 167.5 |

C. Network-Wide Simulation Results

Figure 21:
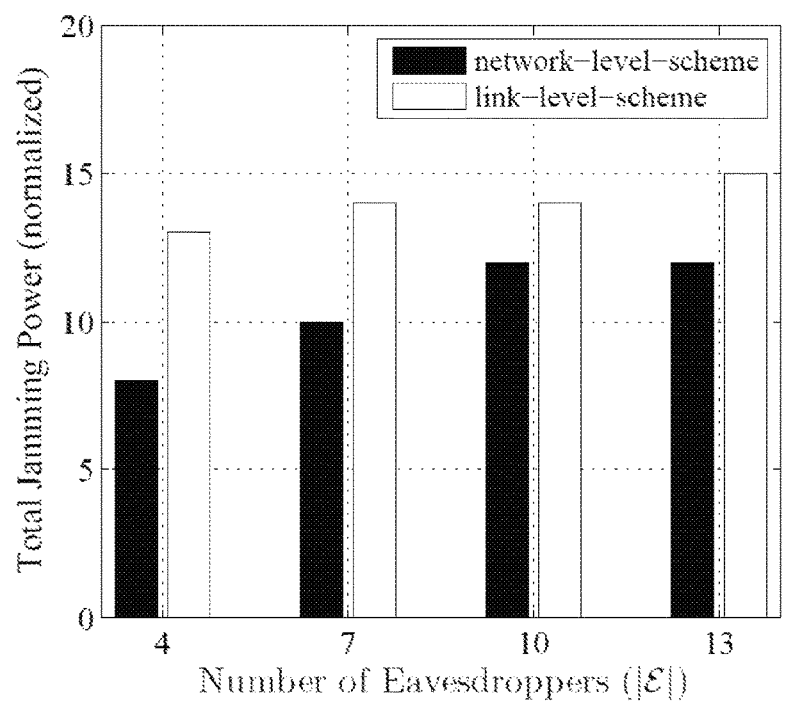
FIG. 21 depicts examples of power consumption of the network-wide and per-link schemes vs. the number of potential eavesdropping locations for the case of two P2P link.
Figure 22:
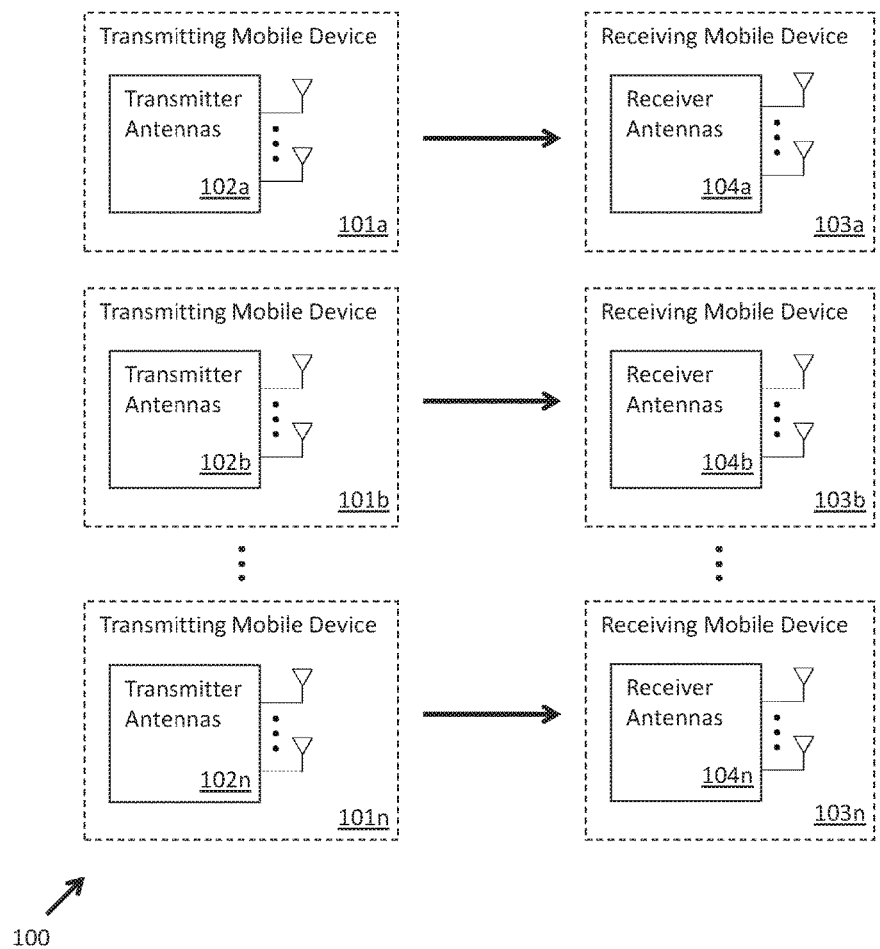
FIG. 22 is a depiction of the resource-efficient, distributed friendly jamming system of Example 1.
Figure 23:
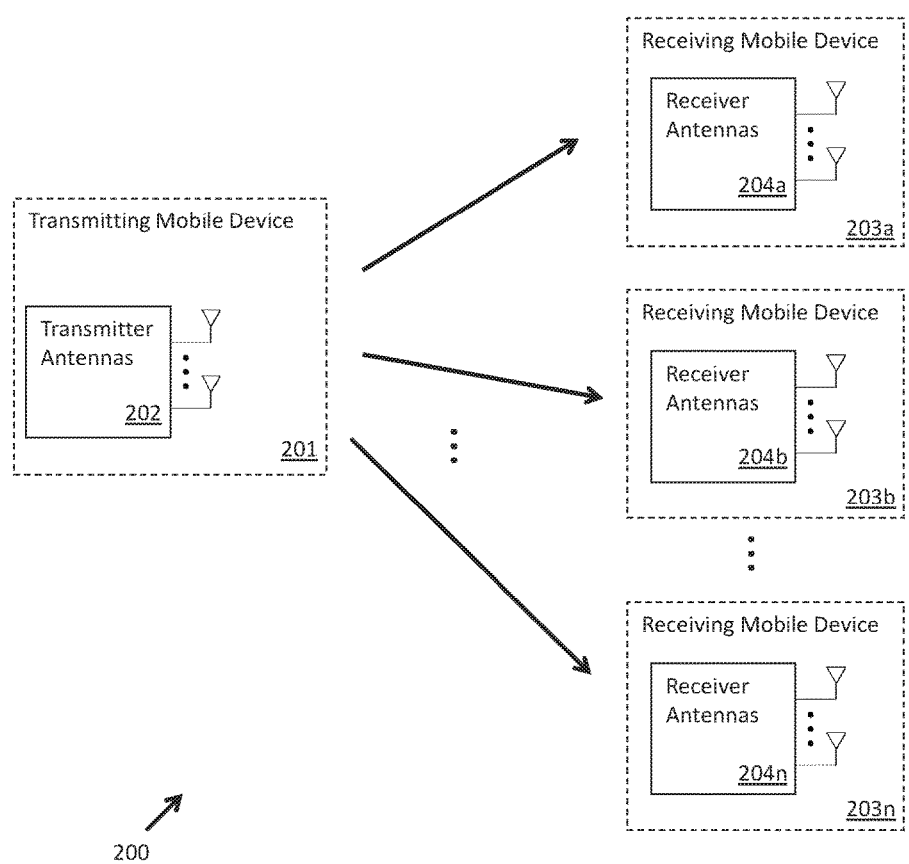
FIG. 23 is a depiction of the integrated transmitter/receiver-based friendly jamming system of Example 2.
Figure 24:
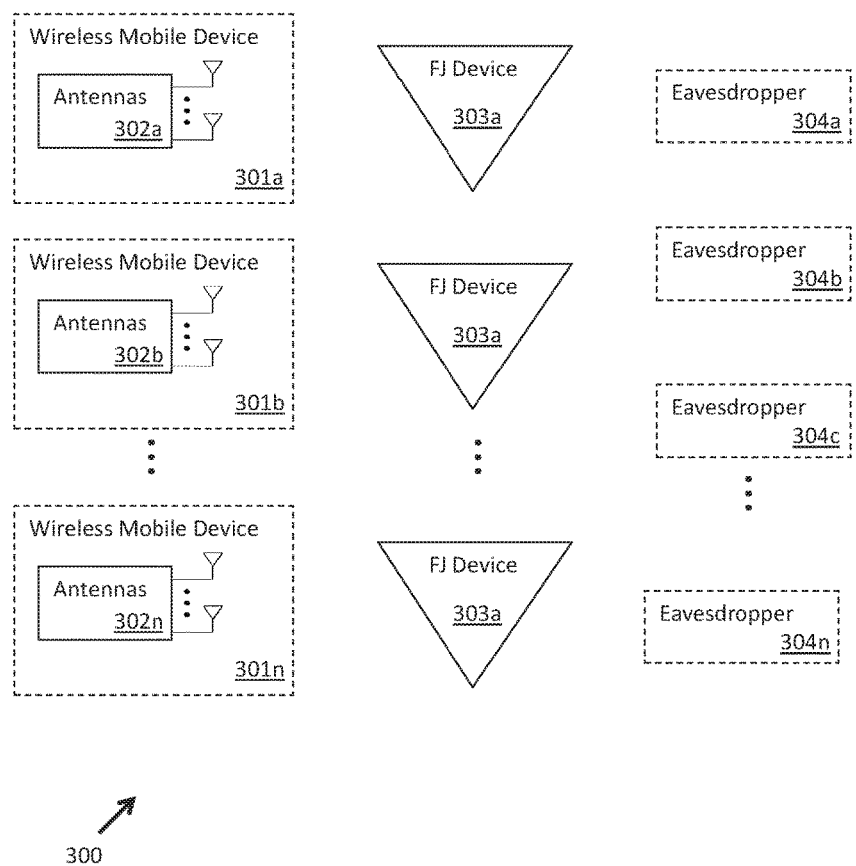
FIG. 24 is a depiction of the efficient friendly jamming system for multi-link wireless networks of Example 3.

To study the energy efficiency of our network-wide optimization strategy, we compare our proposed per-link P2P and network-wide P2P schemes in terms of the total jamming power required to cover the whole network. As shown in FIG. 21, the network-wide scheme reduces power consumption by 14%-38% relative to the per-link scheme. Note that the network-wide scheme allows for simultaneous operations of different links because it ensures the nullification of the FJ signals at all legitimate receivers.

This embodiment of the present invention exploits friendly jamming for PHY-layer security in small-scale multi-link wireless networks in the presence of eavesdroppers. We jointly optimize the powers and locations of the friendly jamming nodes so as to minimize the total jamming power required to secure legitimate transmissions. Distributed MIMO techniques are used to nullify the friendly jamming signals at legitimate receivers. A signomial programming problem was formulated and approximated as a convex geometric programming problem using condensation techniques. We then proposed two optimization strategies: per-link and network-wide (all links jointly). It was shown that our per-link scheme outperforms previous schemes in terms of energy efficiency (55-99 percent power saving). Moreover, the network-wide optimization was shown to be more energy-efficient than per-link scheme (14-38 percent additional power saving) and also requires about half the number of friendly jamming nodes than per-link optimization. For multihop scenarios, we proposed a routing metric that finds a secure path that requires minimal jamming power.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there have been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An integrated transmitter/receiver based friendly jamming system comprising:
   (a) a transmitting mobile device with three or more antennas, capable of transmitting at least two information signals and, simultaneously, an artificial noise signal;
   (b) two or more receiving mobile devices, each receiving mobile device having one or more antennas, wherein a set of channel conditions of each of the two or more receiving mobile devices is known to the transmitting mobile device, wherein each receiving mobile device achieves a secrecy rate, where the secrecy rate is a data rate at which an information signal from the transmitting device can be securely received by the receiving mobile device when one or more eavesdroppers of unknown locations are present, wherein the secrecy rate is zero if the signal-to-noise ratio of the information signal at the receiver drops below a threshold, wherein the signal-to-noise ratio is the ratio of the power of the information signal to the power of all noise sources combined;
   (c) a self-interference cancellation module embedded in each receiving mobile device, wherein the self-interference cancellation module allows each receiving mobile device to transmit a friendly jamming signal while simultaneously receiving an information signal from the transmitting mobile device, wherein the friendly jamming signal is a receiver-based artificial noise signal, wherein the self-interference cancellation module allows the receiver to cancel the receiver-based artificial noise signal, wherein a portion of self-interference is left after cancellation;
   (d) a transmitter precoder embedded in the transmitting mobile device wherein the transmitter precoder utilizes a set of signal processing algorithms for precoding one or more confidential information signals before transmission to the two or more receiving mobile devices, wherein the transmitter precoder also precodes the transmitter-based artificial noise signal; and
   (e) a receiver precoder embedded in each of the two or more receiving mobile devices for precoding the receiver-based artificial noise signal;
   wherein the three or more antennas of the transmitting mobile device are jointly used to simultaneously transmit two or more information signals along with the transmitter-based artificial noise signal to two or more receiving mobile devices,
   wherein the information signal transmitted by the transmitting mobile device to a receiving mobile device of the two or more receiving mobile devices is preceded by the transmitter precoder such that the information signal is cancelled out at unintended receiving mobile devices, and the signal strength of the information signal at each intended receiving mobile device is maximized,
   wherein the transmitter-based artificial noise signal is precoded by the transmitter precoder such that the transmitter-based artificial noise signal cancels out at each of the two or more receiving mobile devices,
   wherein the one or more antennas of each receiving mobile device receives the intended information signal, wherein the effect of the transmitter-based artificial noise signal is cancelled out at each receiving mobile device using zero-forcing beamforming technique implemented at the transmitting device, wherein the unintended information signals are cancelled out at each receiving mobile device using the zero-forcing beamforming technique implemented at the transmitting device, wherein the one or more antennas at each receiving device also transmit a receiver-based artificial noise signal, wherein the self-interference cancellation module cancels the receiver-based artificial noise signal, wherein a portion of self-interference of the artificial noise signal remains,
   wherein the power of the information signal and the receiver-based artificial noise signal at each receiver are set so that the signal-to-noise ratio of the information signal at each receiver exceeds a target threshold, wherein the power of the transmitter-based artificial noise signal is set at a level which optimizes a utility function, wherein the utility function is the sum of the secrecy rates of all receiving mobile devices in the system, wherein the optimal value of the utility function is achieved when the power of the transmitter-based artificial noise signal is equal to the total power budget of the transmitter minus the sum of the transmit powers of the information signals,
   wherein the codewords of the information signals are designed over multiple fading blocks to cope with fast-fading channel conditions and the lack of information about the eavesdroppers' locations, wherein the required amount of randomization in the codewords of the information signals is shared by all receiving mobile devices so as to confuse the eavesdropper.

2. The system of claim 1, wherein the receiver-based artificial noise signal is precoded by the receiver precoder such that the receiver-based artificial noise signal cancels out at every other receiving mobile device in the system.

* * * * *